United States Patent [19]

McCaslin et al.

[11] Patent Number: 5,764,753
[45] Date of Patent: Jun. 9, 1998

[54] HALF-DUPLEX CONTROLLER

[75] Inventors: Shawn Robert McCaslin; Nariankadu Datatreya Hemkumar; Bheeshmar Redheendran, all of Austin, Tex.

[73] Assignee: Crystal Semiconductor Corp., Austin, Tex.

[21] Appl. No.: 536,054

[22] Filed: Sep. 29, 1995

[51] Int. Cl.$^6$ .................................................. H04M 1/00
[52] U.S. Cl. .......................... 379/389; 379/390; 379/409; 379/410; 379/411; 370/286; 370/291
[58] Field of Search .................................. 379/406, 409, 379/410, 411, 309, 388, 389, 390; 370/32.1, 286, 290

[56] References Cited

U.S. PATENT DOCUMENTS

| | | | |
|---|---|---|---|
| 3,832,493 | 8/1974 | Clark | 395/2.39 |
| 4,029,912 | 6/1977 | Geigel et al. | 379/406 |
| 4,131,767 | 12/1978 | Weinstein | 379/411 |
| 4,213,014 | 7/1980 | Luder | 379/406 |
| 4,469,916 | 9/1984 | De Bergh et al. | 379/406 X |
| 4,629,829 | 12/1986 | Puhl et al. | 379/390 X |
| 4,645,883 | 2/1987 | Horna et al. | 379/406 |
| 4,813,073 | 3/1989 | Ling | 379/410 |
| 4,864,608 | 9/1989 | Miyamoto et al. | 379/409 |
| 4,879,745 | 11/1989 | Arbel | 379/389 |
| 4,894,820 | 1/1990 | Miyamoto et al. | 370/32.1 |
| 4,918,727 | 4/1990 | Rohrs et al. | 379/410 |

(List continued on next page.)

OTHER PUBLICATIONS

K. Ochiai, et al., "Echo Canceller with Two Echo Path Models," *IEEE Transactions on Communication*, COM–25, No. 6, pp. 589–595, Jun. 1977.

D. L. Duttweiler, "A Twelve-Channel Digital Echo Canceller," *IEEE Transactions on Communication*, COM–26, No. 5, pp. 647–653, May 1978.

R. Harris, et al., "A Variable Step (VS) Adaptive Filter Algorithm," *IEEE Transactions on Acoustics, Speech and Signal Processing*, vol. ASSP–34, No. 2, pp. 309–316, Apr. 1986.

Joseph B. Evans, "Analysis of a Low Complexity Variable Step Size Adaptive Algorithm," *IEEE*, pp. III–484–487, 1993.

Dennis Morgan, "Considerations in the Design of a Speakerphone," Motorola Inc. Analog Integrated Circuits Division, Analog & Mixed Signal Design Conference 1995, pp. 41–1–41–6.

Primary Examiner—Krista Zele
Assistant Examiner—Shih-Wen Hsieh
Attorney, Agent, or Firm—Gregory M. Howison; J. P. Violette

[57] ABSTRACT

A double-talk detector for an echo canceller includes power estimators (60) and (62) which are utilized to measure the ERLE value in a calculator (64). This ERLE is stored in a register (70) when it is the largest value generated. This register (70) is updated whenever a new and better ERLE occurs. A fraction of the value in register (70) is utilized as an input to a comparator (88), and then compared to the current ERLE value. If the current ERLE differs from the SERLE in register (70) an inhibit signal is generated for blocking the updates of an adaptive filter (40). The value stored in the register (70) is periodically decremented to reduce the value thereof. This decrement operation is performed in response to detection of an utterance from the far-end. A half-Duplex operation is provided with two attenuators (352) and (354) to provide a switching operation and allow only one side access to the communication path. Speech, or the occurrence of an utterance is monitored at each end by comparing the raw input power at each end to a scaled up background noise power for that end. Different scaling factors for speech detection, or utterance detection, are provided, there being a high scaling factor and a low scaling factor. The side with the initially detected utterance will have access to the system and have the lowest scaling factor associated therewith, the other having the highest scaling factor associated therewith.

8 Claims, 13 Drawing Sheets

U.S. PATENT DOCUMENTS

| | | | |
|---|---|---|---|
| 5,014,263 | 5/1991 | Vairavan et al. | 370/32.1 |
| 5,075,687 | 12/1991 | Chen et al. | 379/390 X |
| 5,099,472 | 3/1992 | Townsend et al. | 370/32.1 |
| 5,132,963 | 7/1992 | Ungerboeck | 370/32.1 |
| 5,170,430 | 12/1992 | Schuh | 379/389 |
| 5,193,112 | 3/1993 | Sano | 370/410 |
| 5,263,019 | 11/1993 | Chu | 370/32.1 |
| 5,278,900 | 1/1994 | Van Gerwen et al. | 370/410 |
| 5,327,495 | 7/1994 | Shenoi et al. | 379/410 |
| 5,343,521 | 8/1994 | Jullien et al. | 379/410 |
| 5,357,567 | 10/1994 | Barron et al. | 379/390 |
| 5,365,583 | 11/1994 | Huang et al. | 379/390 |
| 5,390,250 | 2/1995 | Janse et al. | 379/410 |
| 5,418,848 | 5/1995 | Armbrüster | 379/406 |
| 5,434,916 | 7/1995 | Hasegawa | 379/407 X |
| 5,471,528 | 11/1995 | Reesor | 379/388 X |
| 5,473,686 | 12/1995 | Virdee | 379/410 | ns,
HALF-DUPLEX CONTROLLER

TECHNICAL FIELD OF THE INVENTION

The present invention pertains in general to echo cancellers and, more particularly, to a method and apparatus for half-duplex operation of the echo canceller.

CROSS REFERENCE TO RELATED APPLICATION

This application is related to U.S. patent application Ser. No. 08/56,986, entitled "Double-Talk Detector for Echo Canceller", filed of even date herewith (CRYS-23,465).

BACKGROUND OF THE INVENTION

In telephone circuits, for reasons of line economics and easy replaceability, a two-wire configuration is generally adopted for a subscriber line that is connected to a subscriber's telephone set. The two-wire configuration constitutes a configuration wherein a single pair of wires is provided to carry signals in both directions. However, the line to which the subscriber line is connected utilizes a four-wire configuration which provides separate paths for each direction that is adopted.

In the conventional system, the subscriber lines differ in type and length. Therefore, each subscriber line has its own associated impedance and it is therefore difficult to match the hybrid coil perfectly. As a result, the hybrid coil not only passes the signal received from the distant party via the four-wire line to the local party via the subscriber line, but also acts as an echo path. This echo path allows the received signal to leak over to the transmitting side, where it becomes an echo signal that degrades communication quality. To cancel the echo signal, an echo canceller is typically deployed which is connected before the four-wire/two-wire conversion point.

A typical echo canceller may utilize data converters to convert between the analog and digital domains, such that a received analog signal can be converted to the digital domain, processed in the digital domain, and then converted back to the analog domain on both the transmit and receive paths. An adaptive filter in the digital domain is connected between the two paths, with the input of the adaptive filter connected to the received path and the output of the adaptive filter providing an input to a subtraction circuit for adjusting the transmitted value.

When the input signal is received from the distant party, it is sampled by an A/D converter to generate a discrete value at a sample time k, and thus convert it to a digital received signal. This digital received signal is converted by the D/A converter on the output of the receive path to an analog receive signal and then sent to the hybrid and, subsequently, the subscriber line to the local party. If the impedances are not matched, however, the analog receive signal follows an echo path and reaches the transmitting side as an echo signal. The echo signal is sampled by another A/D converter on the subscriber line side at a time k to generate a discrete value at time k, and is thus converted to a digital echo signal, which is fed to the subtractor.

The adaptive filter is operable to estimate the characteristics of the echo path and, from the estimated characteristics of the digital received signal, generate a simulated echo signal which is fed to the subtractor. The subtractor subtracts the simulated echo signal or echo signal from the digital echo signal and generates the difference as a residual signal. The adaptive filter is operable to cancel the echo signal so as to force the residual signal to converge as close as possible to zero.

The above description was directed toward "network echo", the other type being "acoustic echo", double talk presenting a problem to both types. In this type, the adaptive estimation function of the adaptive filter operates normally in the single-talk state, but in the double-talk state in which there is preferentially a transmitted signal from the local party, i.e., due to the party speaking, the estimation function of the adaptive filter is inaccurate, in that it may not provide the appropriate estimation function due to interference from the additional transmitted signal from the local party. Accordingly, echo cancellation devices which employ adaptive filters for estimating a room's response typically include a "double-talk" detection device which monitors the microphone signal to determine when a person is speaking into the microphone. One such detector, described in D. L. Duttweiler, "A Twelve Channel Digital Echo Canceller", IEEE Trans. On Comm., Volcom-26, No. 5, May 1978, declares double-talk when a sample of the microphone signal is greater than or equal to one-half the largest sample of the loudspeaker signal within the last N samples, where N is a constant equal to the maximum delay between the loudspeaker and the microphone. If someone is speaking into the microphone, the energy of the microphone signal is typically at least half that of the loudspeaker signal.

Accordingly, the above described double talk detector properly concludes that someone is speaking into the microphone and disables the adaptive filter from adjusting its taps.

If the loudspeaker and microphone are far apart from each other, the microphone includes little or no acoustic feedback from the loudspeaker. Further, when someone is speaking softly into the microphone, the energy of the soft voice component of the microphone signal is not alone greater than half the energy of loudspeaker signal. Accordingly, the above described double talk detector falsely concludes that no one is speaking into the microphone and therefore enables the adaptive filter to adjust its taps. The filter accordingly begins adjusting the taps in an effort to reduce the echo received at the microphone to zero. Thus, by falsely concluding that no one is speaking into the microphone, the device begins to cut off the voice of the person speaking into the microphone.

If the loudspeaker is placed close to the microphone, the energy of the microphone signal may exceed half the energy of the loudspeaker signal regardless of whether someone is speaking into the microphone. For example, if the room includes ambient background noise such as generated by a fan, the microphone picks up this sound and adds it to the substantial acoustic feedback caused by the close proximity of the microphone and loudspeaker. Accordingly, the energy of the microphone signal may exceed the half of the energy of the loudspeaker signal even when the loudspeaker is the only source of speech in the room. In this case, the above described double talk detector falsely concludes that someone is always speaking into the microphone and therefore permanently disables the adaptive filter from adjusting its taps.

In the above described operation, the system operated in a "full-duplex" mode. However, in some situations, the near-end and far-end have echo paths that result in an unstable operation, causing acoustic howling. One simple way of preventing a far-end user from hearing echos is to turn off the microphone at the near-end while the far-end user is talking, this referred to as half-duplex operation. In general, the prior half-duplex systems have involved a comparison of the signal power at the near-end either to a threshold, or to the signal power at the far end. This incurs some problems in the form of a dependence on relative power levels and a susceptibility to noise.

SUMMARY OF THE INVENTION

The present invention disclosed and claimed herein comprises a half-duplex controller for a two way communication system between a near end servicing a first user and a far end servicing a second user. The half-duplex controller includes receive and transmit switching devices for selectively attenuating the respective signal, with the receive switching device selectively attenuating the received signal at the near end and the transmit switching device selectively attenuating the transmitted signal from the near end. A near-end speech detector is provided for detecting when near-end speech has exceeded a near-end threshold. A far-end speech detector is provided for detecting when far-end speech has exceeded a far-end threshold. A controller then is operable to decrease to a pre-determined low threshold value the one of the near-end and far-end thresholds associated with the one of the near-end and far-end speech detectors that detects speech exceeding its associated near-end or far-end threshold. The other of the near-end and far-end thresholds is increased to a pre-determined high threshold value higher than the low threshold value. The receive switching device is set to selectively attenuate the received signal at the near end and the transmit switching device set to not attenuate the transmit signal from the near end when the near-end threshold is disposed at the low threshold value. The receive switching device is set to selectively not attenuate the received signal at the near end with the transmit switching device selectively set to attenuate the transmit signal from the near end when the far-end threshold is disposed at the low threshold value.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
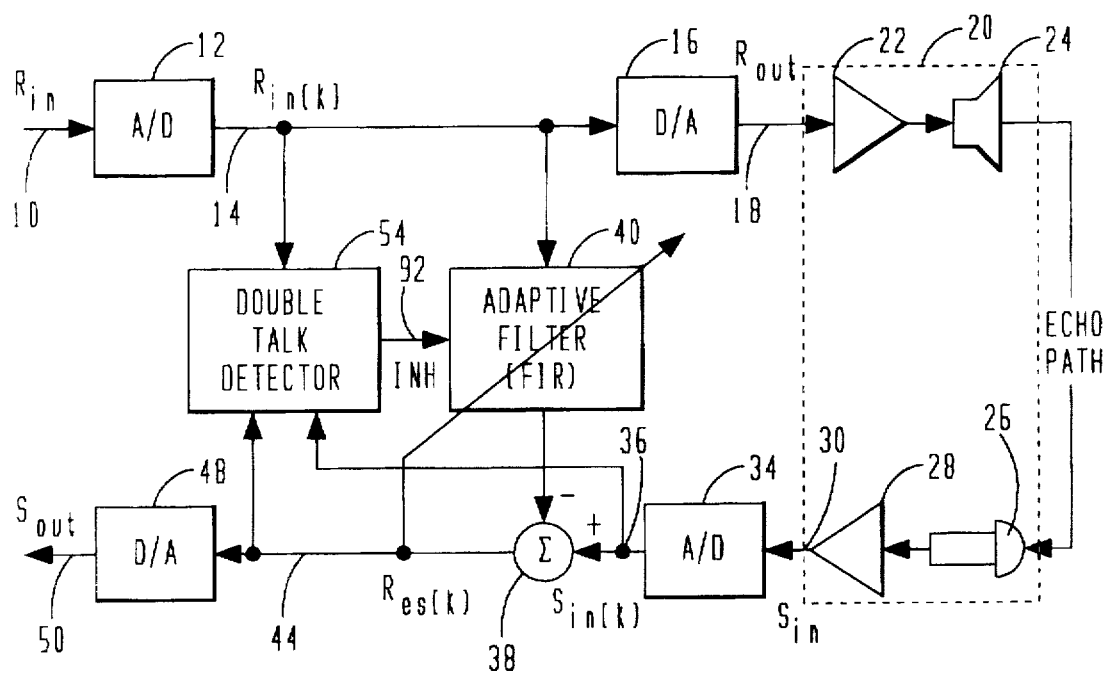
FIG. 1 illustrates an overall diagram of the double-talk detection system of the present invention.

Referring now to FIG. 1, there is illustrated a block diagram of the double-talk detector of the present invention from a general overview. The far-end audio is received from a far-end source through a receive line 10 which is input to an A/D converter 12 to provide on the output thereof a sampled receive value $R_{in}(k)$ on a line 14. This is input to a D/A converter 16 to convert the digital value back to an analog value $R_{out}$. This is input to a near-end device 20. The near-end device is comprised of a receive path wherein the line 18 is input through a buffer 22, the output of which drives a speaker 24. A transmit path is provided via a microphone 26 and a buffer/driver 28, which drives an output line 30 to provide an output signal $S_{in}$.

The transmit path on the output $S_{in}$ is input to an A/D converter 34, which provides a sampled digital output $S_{in}(k)$ on a line 36. This is input to the positive input of a subtraction circuit 38. An adaptive filter 40 is provided, which has the input thereof connected to $R_{in}(k)$ on line 14 and provides on the output thereof a filtered output signal which is input to the negative input of the subtraction circuit 38. This provides the difference of the sampled signal $S_{in}(k)$ on the line 36 and the signal output by the adaptive filter 40. This is output on a line 44 as a residual signal Res(k), this being a sampled signal. This line 44 and the signal Res(k) are input to a D/A converter 48 to provide the output signal to the far end.

The adaptive filter 40 is operable to provide the basic echo cancelling operation, which is well-known in the art. As illustrated in FIG. 1, there is an echo path between the speaker 24 and microphone 26. As such, a portion of the $R_{in}$ signal will be received and fed back to the transmit path resulting in a portion of the $R_{in}$ signal being impressed upon $S_{out}$. The adaptive filter 40 is operable to develop and periodically update an adjustable estimated impulse response of the near-end path and generate, in accordance with the estimated impulse response and a received path signal, an estimate of the echo signal occurring on the transmit-in path in response to the receive path signal. This echo estimate signal is algebraically combined with the transmit-in signal $S_{in}(k)$ with the subtraction circuit 38 to yield the transmit-out path signal Res(k) on line 44. The adaptive filter 40 also received as an input the Res(k) signal for use in the adaptive operation.

In normal operation with the echo path stationary, the echo canceller will estimate the reflection signal, the quality of this estimation determining the degree of echo reduction. The measure of the quality of the estimate is referred to as the echo return-loss enhancement (ERLE). This is defined as the reduction in echo power provided by the echo canceller; equivalently, it is the ratio of the estimated power in the signal at the output of the echo canceller to the estimated echo-power, as follows:

$$ERLE = 10\log \frac{E[S_{in}^2]}{E[R_{es}^2]} \tag{1}$$

Wherein, $E \triangleq$ Expection operator

This echo reduction is also important for reducing loop gain. The far end and the near end are linked by an acoustic loop. If the loop gain in this loop is too high, the loop will become unstable and will produce acoustic howling. If the system at the far end is a full-duplex speaker phone, that speaker phone will be able to operate with higher output and input gain, if it can rely on loop-gain reduction from the near-end echo canceller.

The echo canceller produces the estimate by filtering the signal from the far end with the adaptive filter 40, which is operable to effectively model the echo path and provide a prediction of the echo signal. In modern echo cancellers, this filter is typically trained by the LMS (Least-Mean Squared) algorithm. In such systems, the signal from the far end, i.e., the "training signal" is used to "illuminate" the echo path; that is, the LMS algorithm can estimate the path's response by observing the path's effect on the far-end signal, once it has been received at the near-end microphone 26.

Noise at the near end can interfere with an echo canceller's ability to estimate the path response. For example, near-end stationary noise sets an upper bound on the ERLE that an echo canceller can provide given a particular adaptive filter update gain. Stationary near-end noise can therefore limit the loop-gain reduction provided by the echo canceller. If the near-end noise level is too high, the echo canceller may not be able to provide sufficient loop-gain reduction to prevent instability. However, the uncancelled residual echo may still be largely masked by the near-end noise from the far-end listener's perspective. As a result, stationary noise may undesirably limit the ERLE, but it may not cause the echo to rise to objectionable levels from the far-end listener's perspective.

By comparison, non-stationary noise presents more difficulties. For example, if the background noise suddenly attenuates, residual echo that was being masked by the noise will leak through, making echo clearly perceptible from the far-end listener's perspective until the echo canceller can reconverge to accommodate the new noise floor. Clearly, fast convergence speed is an advantage in this situation.

Another type of non-stationary "noise" is near-end speech. Since near-end speech typically does not occur at the same time as far-end speech, near-end speech does not reliably mask echo. Also, if an echo canceller is allowed to adapt while near-end speech is present, the ERLE when near-end speech is not present will be significantly degraded. Therefore, it is important to block updates while near-end speech is present.

In order to provide this update blocking operation, a double-talk detector 54 is provided. The double-talk detector 54 is operable to control the time that coefficient updates are allowed. The double-talk detector 54 receives as inputs the $R_{in}(k)$ signal on line 14, the $S_{in}(k)$ signal on line 36 and the Res(k) signal on line 44. The figures of merit for a double-talk detector are:

1) Reliability of blocking updates when near-end speech is present. Erroneously updating the adaptive filter while near-end speech (or other non-stationary noise source) is present can seriously degrade canceller performance.

2) Reliability of allowing updates when near-end speech is not present. Erroneously blocking updates while near-end speech is not present will unnecessarily limit performance, and can therefore seriously degrade canceller performance.

3) Cost. Echo-canceller applications are typically cost sensitive, so minimizing cost is important.

In the above description, the echo is an acoustic echo. However, there are other types of echoes; for example, echo, which also interferes with communications, is generated in telephony networks. In this case, the network (classically called "network echo") is electrical, this echo being generated when a signal is reflected off of an impedance discontinuity at a two-wire to four-wire hybrid. An echo canceller can be used to cancel these network echoes. The figures of merit described above for an acoustic echo canceller, as well as the basic operation, are the same for a network canceller, such that the invention described herein would apply in both acoustic and in network-echo applications.

Figure 2:
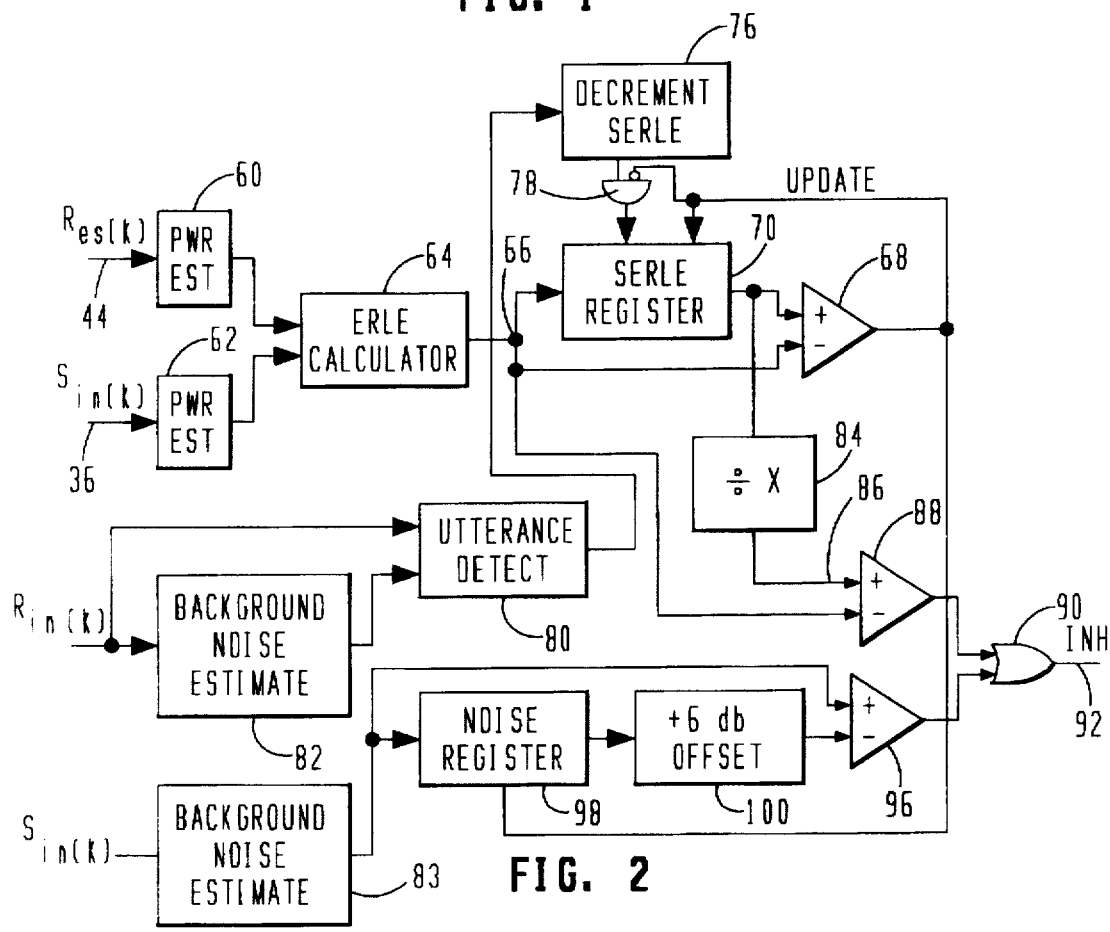
FIG. 2 illustrates a detailed block diagram of the double-talk detector.

Referring now to FIG. 2, there is illustrated a detailed block diagram of the double talk detector. Both the Res(k) signal from line 44 and the $S_{in}(k)$ signal from line 36 are input to respective power estimation circuits 60 and 62. The power estimation circuits 60 and 62 are peak-detecting power estimators which utilize a single-pole infinite impulse response (IIR) filter. In the preferred embodiment, the power estimator is a "leaky" peak estimating power estimator which is defined by the following equations:

$$P(k)=\alpha P(k-1)+(1-\alpha)\ [X(k)]^2 \qquad (2)$$

if $$[X(k)]^2) P(k),\ P(k)=[X(k)]^2 \qquad (3)$$

Wherein, $k \triangleq$ time index $\alpha \triangleq$ iir pole constant

For far-end input power, $R_{in}$ would be substituted for the value of X and for near-end input power, $S_{in}$ would be substituted for X. In this estimator, Equation 2 is a one-pole IIR filter, though it could be implemented as a multi-pole IIR filter, or as an FIR filter. Equation 3 is a peak detector. Instead of utilizing a squaring function on the input, both Equations 2 and 3 could use an absolute value (|X(k)|) to reduce complexity. Note that the use of equations 2 and 3 deviates from the formal, strict definition in equation 1.

The output of the power estimators 60 and 62 are input to an ERLE calculator 64. The ERLE calculator 64 calculates the ERLE in accordance with Equation 1 and provides the output on the node 66. The output value is input directly to the negative input of a comparator 68 and also to the input of a register 70. The register 70 is a register for storing the best value for ERLE, the "SERLE", which best value would be the largest value. The output of the register 70 is connected to the positive input of the comparator 68, such that whenever the SERLE value in register 70 is higher than the value output by the ERLE calculator 64, an update would be provided and the new value stored in the register 70 as the new SERLE, this update input on the register 70 connected to the output of the comparator 68.

The ERLE operation of the present invention utilizes a discriminating operation wherein the SERLE value stored in the SERLE register 70 is decremented upon the detection of some type of "utterance" at the far end. A decrement device 76 is provided, which causes the decrement operation. The output of the decrement device 76 is input to one input of an AND gate 78, the output of which drives a decrement input on the register 70. However, the gate 78 is blocked whenever an update signal is generated, this effected by connecting the output of the comparator 68 to the negative input of the AND gate 78. A far-end utterance detector 80 is provided which has one input thereof connected to the line 14 to receive the $R_{in}(k)$ signal. Another input is connected to the output of a background noise estimator 82, which estimates background noise from the $R_{in}(k)$ signal. Although not shown, a near-end utterance detector is provided to receive the $S_{in}(k)$ signal and process it similar to the operation described above with respect to $R_{in}(k)$.

The output of the register 70 is divided by a predetermined percentage, as represented by a block 84, to provide a fraction on an output 86. The fraction of the SERLE on line 86 is input to the negative input of a comparator 88. The positive input thereof is connected to the output of the ERLE calculator 64 such that the comparator 88 makes a decision utilizing as a threshold input a fraction of the SERLE. The output of the comparator 88 is input to one input of an OR gate 90, which provides the inhibit signal INH to the adaptive filter 40 on a line 92. Therefore, updates are blocked or inhibited whenever the current ERLE is less than the SERLE stored in register 70 by a predetermined fraction of that SERLE. This is compared to prior art systems that utilize a fixed difference, such as 6 dB above the SERLE. In the preferred embodiment, the fraction provided by the block 84 is fifty percent (in dB). The advantage to utilizing a fraction instead of a fixed value is that small changes in the echo path or training-signal characteristics can be accommodated without compromising convergence speed.

To accommodate changes in the echo path, the SERLE value stored in register 70 (SERLE) is decreased by a fixed amount periodically. If the current ERLE on node 66 decreases substantially due to a path change, updates may be blocked. By decreasing the SERLE value periodically, eventually updates will be re-enabled, even for radical path changes. As a result, a supplementary path change detector may not be needed for handling mild path changes. In systems in which radical path changes are expected, a delay between the path change and complete recovery may be too long, in which case, a supplementary path-change detector would be required. This operation is provided by the decrement block 76.

In the preferred embodiment, the SERLE value (in dB) is decremented at the onset of each utterance from the far-end. An utterance at the far end is defined by a transient increase in far-end signal power. A disadvantage to gradually decreasing the SERLE value stored in register 70 is that updates may eventually be enabled during times when the near-end noise floor is elevated. This is an important issue, because typically the ERLE in practical applications is limited by the near-end noise level. If the near-end noise level rises and an echo canceller is allowed to update, the ERLE is likely to decrease. Fortunately, the elevated noise will likely mask much of the resulting higher echo from the far-end's perspective. Unfortunately, the loop-gain reduction being provided by the echo canceller will also decrease. If the far end is relying on the near-end echo canceller for a loop-gain reduction, the loop may go unstable if the SERLE value is reduced too much in register 70.

Prior art systems for situations where a path change does not occur provide no benefit until the difference between the best ERLE (SERLE) and the current ERLE is more than a fixed value, such as 6 dB. This provides a benefit, since it allows the SERLE to be maintained (as long as the path does not change), even if the near-end background level rises. The problem is, however, that the prior art is likely to clear the values stored in register 70 when minor path changes occur.

In applications where minor path changes are likely to occur, the SERLE value will be cleared frequently, even in high-noise applications, thus effectively eliminating the advantage provided thereby.

If, as provided by the decrement box 76, the value of the SERLE is gradually decreased, and the near-end background noise level increases, the actual or current ERLE will also decrease. This can be a disadvantage, since the loop-gain reduction provided by the echo canceller will decrease. To prevent unnecessary degradation to the ERLE due to rises in the near-end noise floor, it is necessary to block updates when the near-end background noise level rises significantly. In particular, the background near-end noise level (calculated the same way as the far-end background noise-power) is saved whenever the SERLE value is replaced with the current ERLE value. Then, updates are blocked whenever the current near-end noise floor is higher (in the preferred embodiment, by 6.0 dB) than the saved background noise level.

This feature is provided by a comparator 96 which has the positive input thereof connected to the output of a near-end background noise estimator 83. The background noise is compared with a stored value in a noise register 98 received from the background noise estimator which is then offset to a higher level by 6 dB with an offset circuit 100. The offset value in the noise register 98 is input to the negative input of the comparator 96. Whenever the background noise output by the background noise estimator 82 rises above the previously stored estimated value by a value of 6 dB, the output of the comparator 96 goes high, this being input to the other input of the OR gate 90, thus providing an inhibit signal under this condition. The noise value is stored in register 98 whenever the contents of register 70 are updated.

Figure 3:
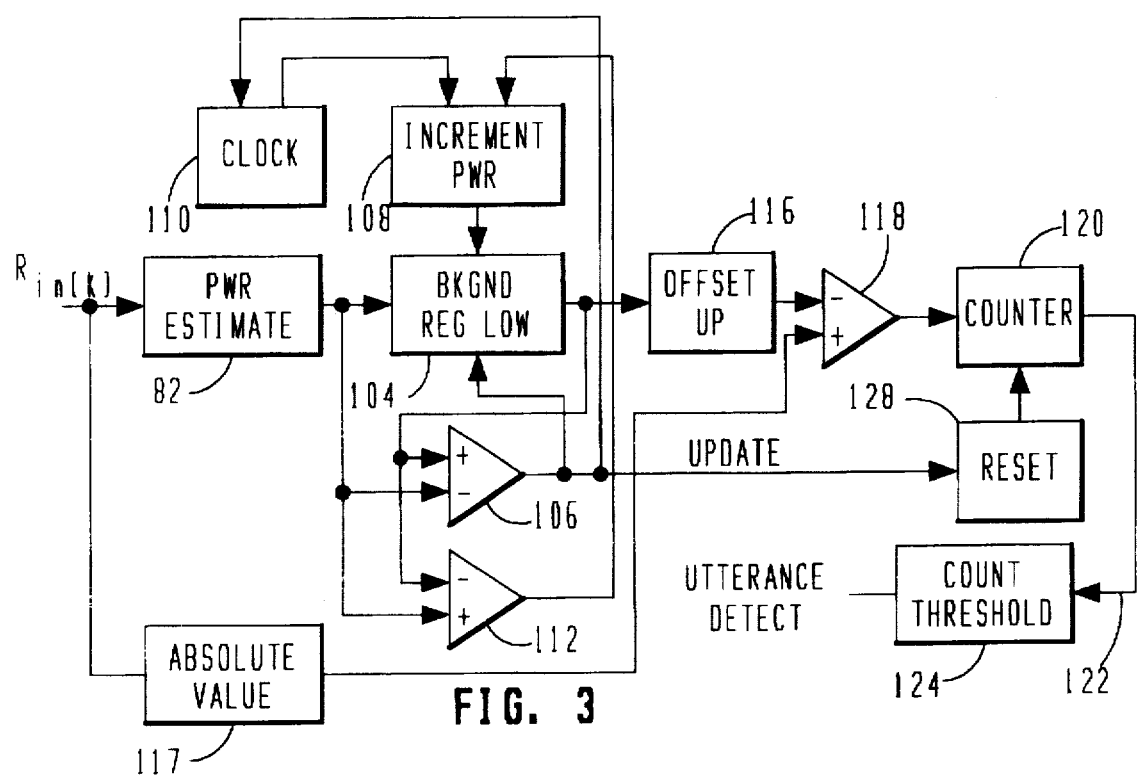
FIG. 3 illustrates a detailed block diagram of the portion of the double-talk detector utilized for detecting utterances.

Referring now to FIG. 3, there is illustrated a block diagram of the utterance detector 80 and the operation thereof. It should be understood that this discussion, although directed toward far-end utterance detection, applies equally to near-end utterance detection. If the far-end power is higher than the background noise-power for a pre-specified period of time, the background noise-power estimate is increased slightly (to compensate for increases in the background noise power level), preferably by a fixed amount in dB. In the preferred embodiment, the increase is 3 dB every 0.75 seconds.

Instead of increasing the background noise of the power estimate only after a pre-specified period of time, it is possible to increase the background noise power by a small amount each sample time. However, the former implementation is preferable, since the increment is a fixed amount in dB, and a few large increments in dB are easier to implement than many small increments.

At each sample time, the absolute value of the raw input from each end is compared to its respective background noise-power estimator. When rising excursions of the raw input in which the raw input crosses the background noise power level, scaled up by some pre-specified factor, an "utterance-detector" counter for that end is incremented. Whenever the background power estimate is lowered, the utterance-detector counter for that end is cleared. If the utterance-detector counter exceeds a particular threshold (in the preferred embodiment), an utterance is declared detected.

Referring further to FIG. 3, the power estimate is provided by the block 82 which receives the input $R_{in}(k)$. The output of block 82 is input to a register 104 which is operable to store the lowest value for the background power. This register is updated via a comparator 106, the negative input thereof connected to the output of the power estimator 82. The positive input thereof is connected to the output of the register 104 to provide a threshold value. Therefore, whenever the output of power estimator 82 falls below the stored value, background power is updated and a clock 110 is restarted. This therefore provides the lowest background power value. A scaling block 108 is provided for increasing the value stored in the background register 104 by the predetermined value of 3 dB whenever a predetermined time period provided by the clock 110 expires. This is provided with a comparator 112, having the positive input thereof connected to the power estimator output 82 and the negative input thereof connected to the output of the register 104.

The output of the register 104 is connected to an offset register 116, the output thereof providing an upwardly offset value by a factor of 6 dB. This is input to a negative input of a comparator 118, the positive input connected to the raw input signal $R_{in}(k)$ through absolute value block 117. The output of the comparator 118 goes high whenever the raw input rises above the offset background power value. This increments a counter 120 to provide an output count value on a line 122. Whenever the count value is above a threshold count value, provided by a block 124, an utterance detect signal is provided. The threshold, as described above, is a count value of eight. The counter 120 is reset whenever an update signal to the register 104 is provided on the output of the comparator 106, this provided by a reset circuit 128, this also input to clock 110 as a reset signal.

Figure 4:
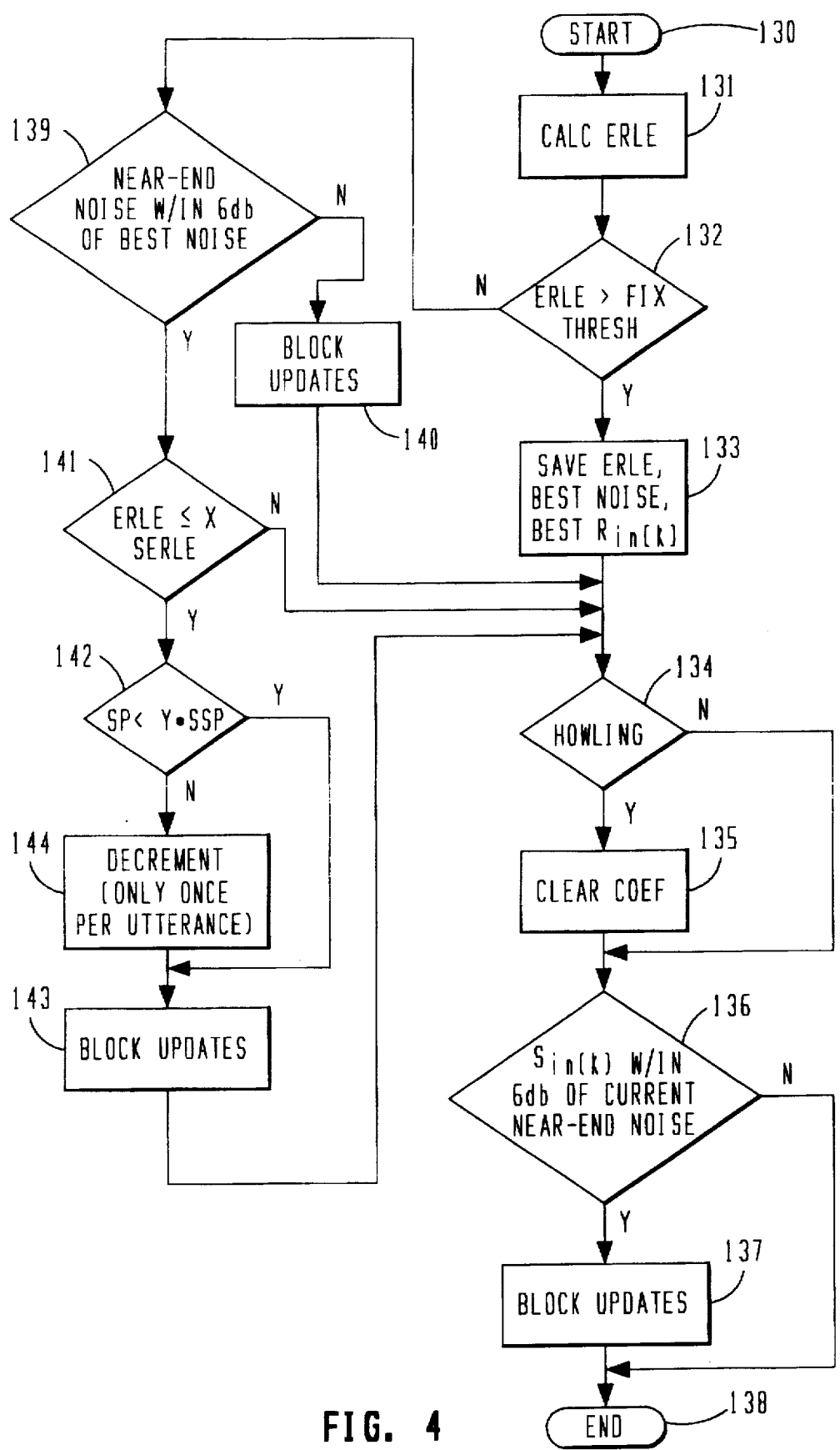
FIG. 4 illustrates a flowchart for the overall operation of the double-talk detector.

Referring now to FIG. 4, there is illustrated a flowchart depicting the overall operation of the echo canceller of the present invention. The program is initiated at a Start block 130 and then proceeds to a function block 131 to calculate the current ERLE value. The program then proceeds to a decision block 132 wherein the determination is made as to whether the value of the current ERLE is greater than a fixed threshold value, this fixed threshold value typically being a value of "10". However, it should be understood that this value could be something different. If it is determined that the value of ERLE exceeds the value of "10", the program will proceed along the "Y" path to a function block 133. The function block 133 is the operation wherein the current ERLE is saved as the SERLE value in the register 70. Additionally, during this save operation, the value of SERLE is limited or clamped to a value of "10". As such, the saved SERLE value in the register 70 can therefore not go to a value above "10". Although in the present embodiment the fixed value which ERLE is compared with in decision block 132 has a value of "10", this value could vary. If this value were lower, a lower value of ERLE could be stored in the register 70 as the SERLE value. However, if the value of ERLE was "13", then only the value of "10" would be stored as the SERLE value in register 70. Additionally, the near-end noise is measured and, if the SERLE value is updated, then this current noise level is saved as the "best" noise. The signal power of $R_{in}(k)$ is measured and compared with a saved signal power value. If this signal power exceeds the previously saved signal power, then this best $R_{in}(k)$ value is saved.

After the function block 133 operations are performed, the program will flow to a decision block 134 to determine if a howling detection has been made. If so, the program flows along a "Y" path to a function block 135 to clear the coefficients in the adaptive filter 40. If no howling has been detected, the program will flow along the "N" path to the input of a decision block 136, the program also flowing from function block 135 to decision block 136. Decision block 136 determines whether the transmitted power at the near-end, $S_{in}(k)$, is within 6 dB of the current near-end noise. If so, the program flows along a "Y" path to a function block 137 wherein updates to the adaptive filter 40 are blocked. The program then flows to an End block 138. If the value of the $S_{in}(k)$ is not within 6 dB of the current near-end noise, i.e., it is more than 6 dB higher than the current near-end noise, then the program will flow along the "N" path to the End block 138.

If the decision block 132 determined that the current value of ERLE was not greater than the fixed threshold, the program will flow along the "N" path from decision block 132 to a decision block 139. Decision block 139 determines whether the near-end noise is within 6 dB of the best noise value. If not, this indicates that the current near-end noise is more than 6 dB greater than the stored best noise value stored. The program would then flow along the "N" path to a function block 140 to block updates to the adaptive filter 40 and then to the input of the decision block 134. However, if the decision block 139 determined that the near-end noise was within 6 dB of the best noise, the program would flow along the "Y" path to a decision block 141. Decision block 141 determines if the current value of ERLE is less than or equal to a fraction "X" of the SERLE value stored in register 70. In the preferred embodiment, this fraction is 0.5. Therefore, if the ERLE is equal to or less than 50% of the stored SERLE value in register 70, then the program will flow along the "Y" path to a decision block 142. However, if it is determined that the ERLE value is greater than 50% of the SERLE value stored in register 70, the program will flow along the "N" path to the input of decision block 134.

The decision block 142 determines whether the signal power "SP" of $R_{on}(k)$ is less than a fraction "Y" of a stored signal power "SSP" that represents the best far-end input signal power. The fraction "Y" is such that the value to which it is compared is 24 dB below the SSP value. If it is determined that the stored signal power "SSP" multiplied by the scaling factor "Y" is greater than the signal power "SP", the program will flow along the "Y" path to a function block 143 wherein updates to the adaptive filter 40 are blocked. However, if it is determined that the signal power is greater than the scaled down "SSP" value, the program will flow along the "N" path wherein a decrement operation will be performed, as indicated by a function block 144. However, the decrement operation is allowed to only operate once per every utterance detection. Since an utterance is defined as a transient in the signal power at the far-end, then each transient in the far-end signal power will result in a decrement operation. The program will flow from the function block 143 back to the input of decision block 134.

Figure 5:
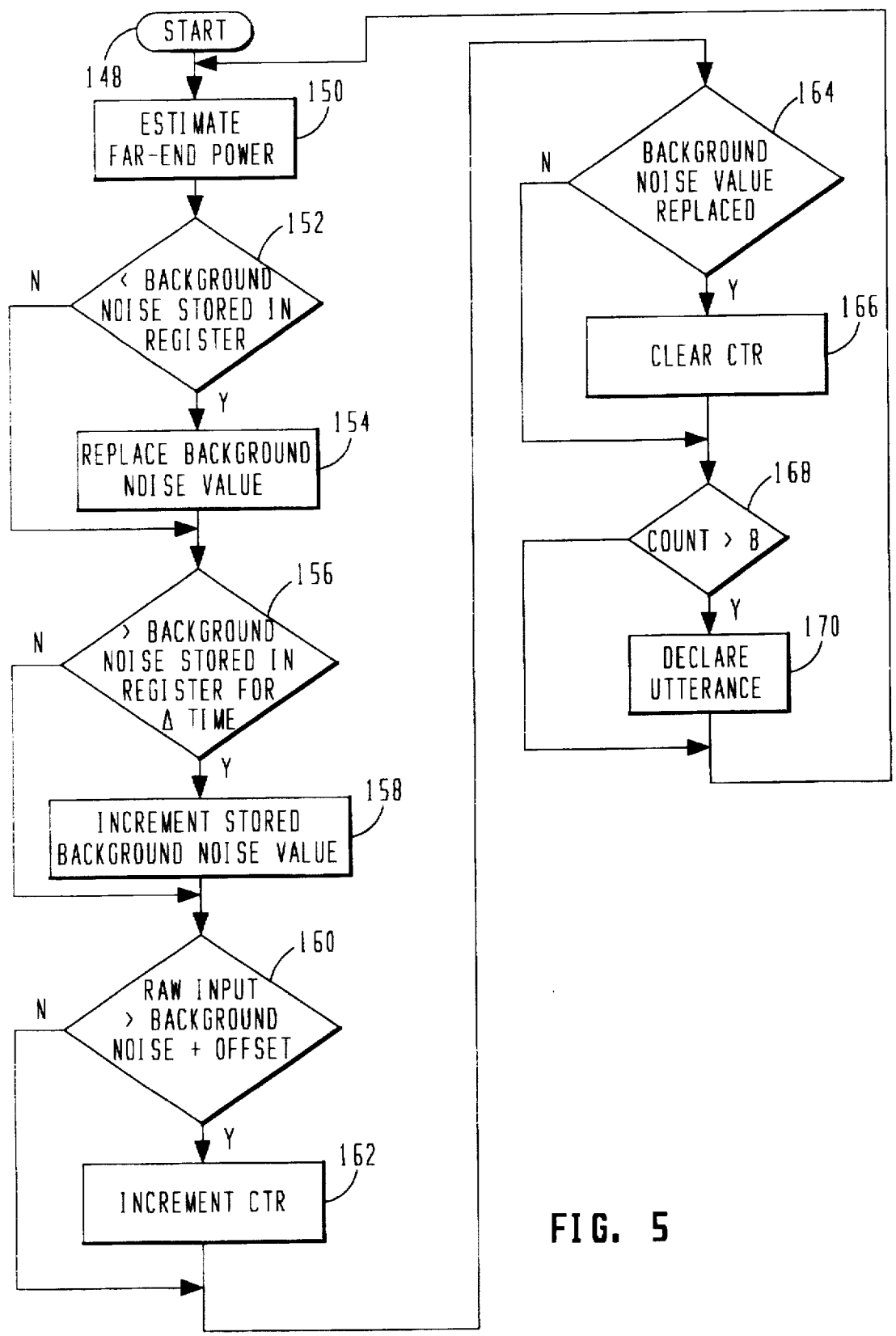
FIG. 5 illustrates a flowchart for the utterance detection operation.

Referring now to FIG. 5, there is illustrated a flowchart depicting the utterance detection operation for the far-end operation, it being understood that this applies to a near-end utterance detection. The program is initiated at a start block 148 and then proceeds to a function block 150 to estimate the far-end power (near-end power for detection of a near-end utterance). The program flows to a function block 152 to determine if the far-end power is less than the far-end background noise stored in the register 104. If so, the program flows along a "Y" path to a function block 154 to replace the far-end background noise value. If negative, the program will flow along the "N" path to the input of a decision block 156, this also being the path from block 154.

The decision block 156 determines whether the far-end background noise stored in register 104 is present for a predetermined amount of time. If so, the program flows along a "Y" path to a function block 158 to increment the stored background noise value in register 104. If not, the program flows along an "N" path to the input of a decision block 160, this also being the path from the block 158.

The decision block 160 determines if the raw input $R_{in}(k)$ is greater than the far-end background noise plus an offset ($S_{in}(k)$ for near-end utterance detection and the stored near-end background noise). If so, the program flows along a "Y" path to a function block 162 to increment the counter 120. If not, the program flows along an "N" path to the input of the decision block 164, this also being the path from the function block 162.

The decision block 164 determines whether the far-end background noise value has been replaced, i.e., whether it has been updated. If so, the program flows along the "Y" path to a function block 166 to clear the counter 120 and then to the input of a decision block 168. If the far-end background noise value were determined as not having been replaced at decision block 164, the program would flow along the "N" path to the function block 168. The function block 168 determines whether the count value in counter 120 is greater than 8, and if so, the program will flow to a function block 170 to declare a far-end utterance. If not, it will flow along an "N" path back to the input of function block 150, this also being the path from the block 170.

Figure 6:
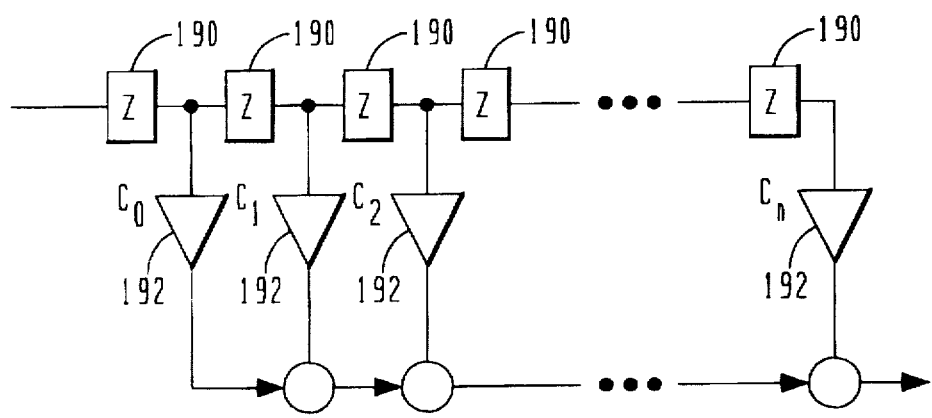
FIG. 6 illustrates a block diagram of a FIR filter.

Referring now to FIG. 6, there is illustrated a general block diagram of a Finite Impulse Response (FIR) filter that is utilized to realize the adaptive filter 40. The typical FIR filter is realized with a delay chain comprised of a plurality of delay blocks 190 which are arranged in a serial manner. In the present embodiment, there are 512 taps with 512 delay blocks, with a tap existing between each of the adjacent delay blocks and one at the output of the 512th delay block 190. Each of the taps is input through a coefficient block 192 in order to multiply the value at that tap by the associated coefficient value for each of the coefficient blocks 192, these coefficients being $C_0, C_1, C_2, \ldots, C_{511}$. The outputs of the coefficient blocks 192 are then input into an accumulation section to provide an output value. This is a conventional technique. In order to perform the adaptive function of the adaptive filter 40, it is necessary to adjust the coefficient values $C_i$. The update operation is one that utilizes some type of iterative procedure such, as described above, a Least Means Squared (LMS) algorithm. Of course, it should be understood that other types of algorithms can be utilized. In any of the algorithms that are utilized to generate the appropriate impulse response for storage in the FIR filter, the weights will be changed by calculating a delta value for the change, and then applying this change. During this calculation process, this delta value can be examined to determine how the system is performing.

In order to accommodate a "radical path change" situation, a Variable Step Size algorithm is utilized, which is disclosed in U.S. Pat. No. 4,894,820 issued Jan. 16, 1990, which is incorporated herein by reference. In U.S. Pat. No. 4,894,820, this algorithm is utilized to control step size, whereas the present invention utilizes the algorithm to detect path changes. In the use of the Variable Step size algorithm in the present invention, for any particular tap in the adaptive filter, the update term for that tap will tend to have the same sign for each sample time during convergence of the filter. Once the filter has completed convergence, the sign of the update term will likely vary. The average value of the sign of this term will be zero. If the absolute value of the average of the sign of the update term exceeds a particular threshold, convergence is in progress. If it is below the threshold, convergence is declared complete. This algorithm facilitates a reduction in update gain once the adaptive filter has achieved a particular level of convergence.

In the preferred embodiment of the present invention, the sign of the update term for a particular tap is utilized if the path change has occurred for that tap. The equations for the update terms are calculated as follows:

$$C_{ik} = C_{i(k-1)} + \Delta_i \qquad (4)$$

$$C_{ik} = C_{i(k-1)} + \beta \frac{ex_i}{\sigma_x^2} \qquad (5)$$

where:
β=scaling factor
e=$S_{in}(k)$–adaptive filter output convolution
$x_i$=delay line In the preferred embodiment, the absolute value of the average of the sign of the update term is utilized wherein it is summed over a particular period of time to indicate if a path change has occurred. If its value exceeds a particular threshold at the end of the measurement period (10 ms in the preferred embodiment), a path change is declared for its associated filter tap. Note that, instead of summing over a measurement period, the absolute value of the average of the sign of the update term could be passed to a low pass filter, either an Infinite Impulse Response (IIR) or FIR filter.

The value of the SERLE stored in the register 70 is decremented whenever a path change is declared. Therefore, it is not necessary to detect small changes in the echo path—only radical path-change detection is needed. By assuming that radical path changes always affect at least the filter tap that has the largest magnitude, one can design the path-change detector to operate on only a single tap-the largest tap-at any particular time.

To further simplify the operation, the largest tap is not necessarily utilized. Instead, a "block-scale normalizer" can be utilized. This is a conventional device that is well known in the art. In this application, it would operate by searching through all filter taps to find those taps whose absolute magnitude has the bit set that is the most significant (note, however, that no normalization would be performed in this step). This group of taps will be the largest, over a potential range of 6 dB. Of these, the last tap would be chosen (the tap that is located at the largest delay). The sign bit of the update term for this tap is then connected to the input of an "up/down" counter. At each sample time, this value is incremented or decremented, depending on the sign of the update term. At the end of the measurement period, the magnitude of the value in the "up/down" counter is compared to an absolute threshold. If the magnitude exceeds the threshold, a path change is declared. If a path change is detected, the value of the SERLE is cleared, the "best" near-end background power estimate to the maximum-positive value is saved, the coefficients of the adaptive filter are cleared, and the operation is changed to half-duplex operation.

The reasons that the radical path change is treated in this manner is that, if a radical path change occurs, the current ERLE will likely become negative until reconvergence occurs. By clearing the coefficients when the radical path change occurs, less echo will be transmitted back to the far end, and reconvergence will therefore be faster than decrementing SERLE. If the far end is relying on the near-end echo canceller for loop-gain reduction, the loop may go unstable. To prevent instability, a half-duplex algorthim, is enabled when a radical path change is detected, and is disabled once the SERLE has reached a pre-determined threshold. Although the exact half-duplex algorithm utilized is not important, one example would be that described in the Motorola Telecommunications Databook for the Motorola MC34118 Voice-Switched Speaker Phone Circuit. As a result, the saved best near-end noise is reset to the maxium-positive value, effectively restarting that parameter. The SERLE needs to be cleared to allow the echo canceller to be updated, since otherwise, the double-talk detector is likely to completely block updates. The fact that half-duplex operation is enabled at this point helps, since double-talk, which could interfere with coefficient updates, should be blocked by the half-duplex operation.

Figure 7:
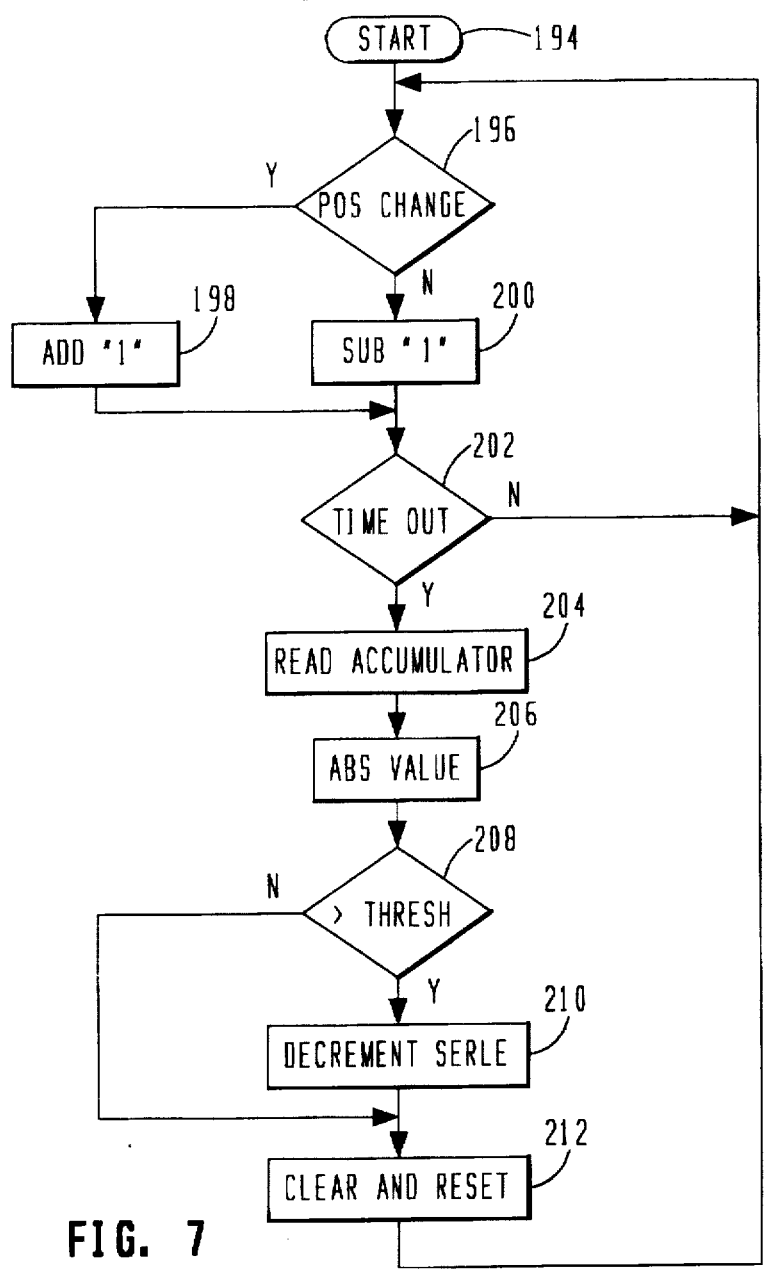
FIG. 7 illustrates a flow chart of the radical path change operation.

Referring now to FIG. 7, there is illustrated a flow chart for the determination of radical path change, which is initiated at a Start block 194. The program then proceeds to a decision block 196 wherein it is determined whether a positive change exists for the update operation. This is obtained by averaging the delta values for all or select coefficients over a predetermined duration of time. Once this average is calculated, the determination is made as to whether it is a positive change or negative change. If positive, the program will flow along the "Y" path to a function block 198 to add a value of "1" to the accumulation register. If it is not a positive change, it must be a negative change and then the program flows to a function block 200 to subtract the value of "1" from the accumulation register. This will continue for a predetermined period time, as represented by a time out decision block 202 which will flow back to the input of decision block 196 until a time out has incurred. After the time out has occurred, the program will flow from the decision block 202 along a "Y" path to a function block 204 to read the value in the accumulator. This value then has the absolute value thereof calculated in a function block 206 and then flows to a decision block 208. The decision block 208 determines whether the absolute value of the accumulator contents are greater than a predetermined threshold. If so, the program will flow along the "Y" path to a function block 210 to decrement the SERLE value stored in the register 70 and, if it is not greater than the threshold, the program will flow along an "N" path. If the decision is negative or if the value in the register 70 has been decremented, the program will then flow to a function block 212 wherein the value in the accumulator is cleared and then reset, as described above, and then the program will flow back to the input of the decision block 196 to again determine if a radical path change is still present. Alternately, the radical path change detection operation results in clearing of the SERLE value, clearing of the coefficients and initializing of the best far-end noise power to a maximum power value.

Figure 7A:
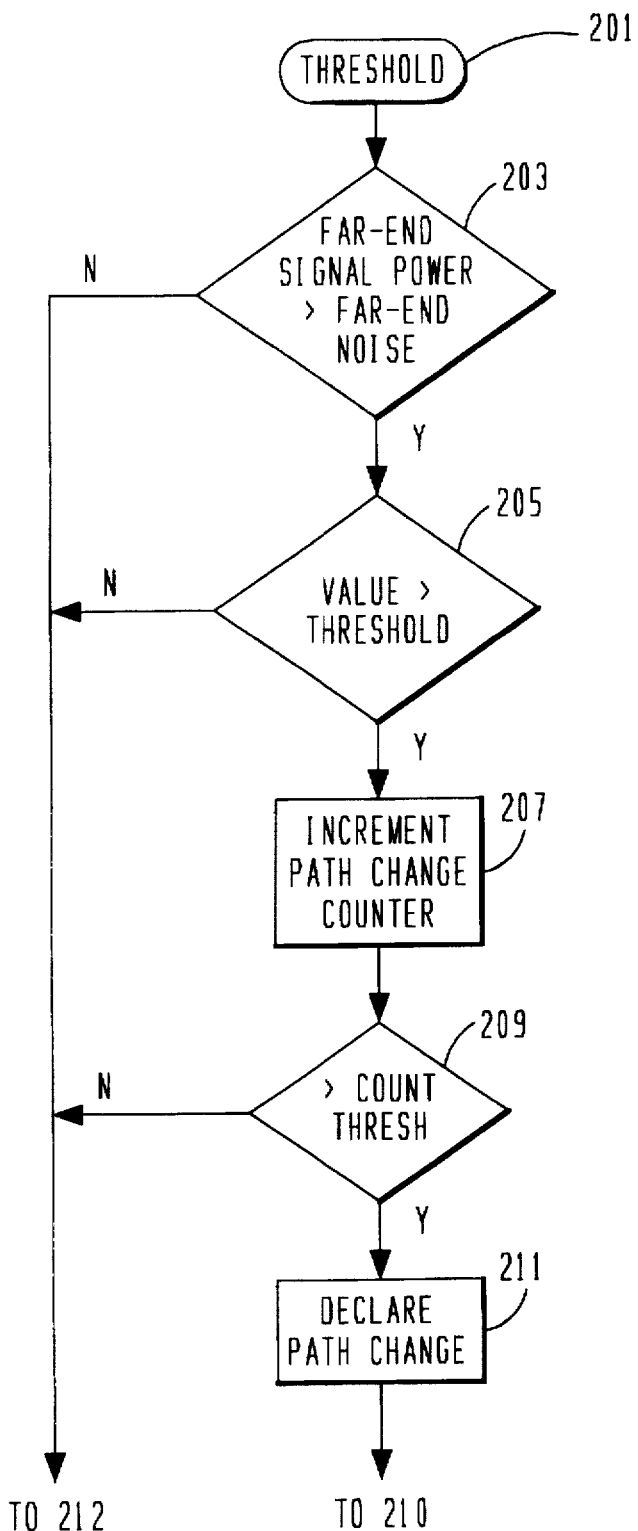
FIG. 7a illustrates a flowchart for the operation to determine if a path change has occurred.

Referring now to FIG. 7a, there is illustrated an alternate method for determining if the value stored in the accumulator is greater than a threshold. In this operation, a path changed detection is conditioned on signal-power level from the far end, wherein a path change may only be declared when the signal-power from the far end is above the far-end background noise power by some pre-determined amount. Additionally, to maximize confidence in path-change decisions, multiple declarations of path change must be made before acting on them and declaring a path change.

In the flowchart FIG. 7a, the threshold operation is initiated at a block 201 and then the program proceeds to a decision block 203 wherein a determination is made as to whether the far-end signal power is greater than the far-end noise power by more than a pre-determined amount. If so, the program flows along the "Y" path to a decision block 205, and if not, the program flows along the "N" path to the function block 212 of FIG. 7. The decision block 205 determines whether the value stored in the accumulator is greater than the pre-determined threshold. If not, the program flows along the "N" path to function block 212 and, if so, the program flows along the "Y" path to a function block 207 wherein a path change counter is incremented. This path change counter is decremented whenever a path change is declared, i.e., when the program flows to the function block 210 in FIG. 7. After this counter has been incremented, a decision block 209 determines whether a count threshold has been passed. If not, the program will flow along the "N" path to function block 212 and, if so, the program will flow along a "Y" path to a function block 211 to declare a path change and then to the function block 210. As described above, the function block 210 is the operation wherein, in one embodiment, the SERLE value is decremented. In another embodiment, the SERLE value is cleared, the best noise value is initialized and the best far-end input power level is cleared.

Figure 8:
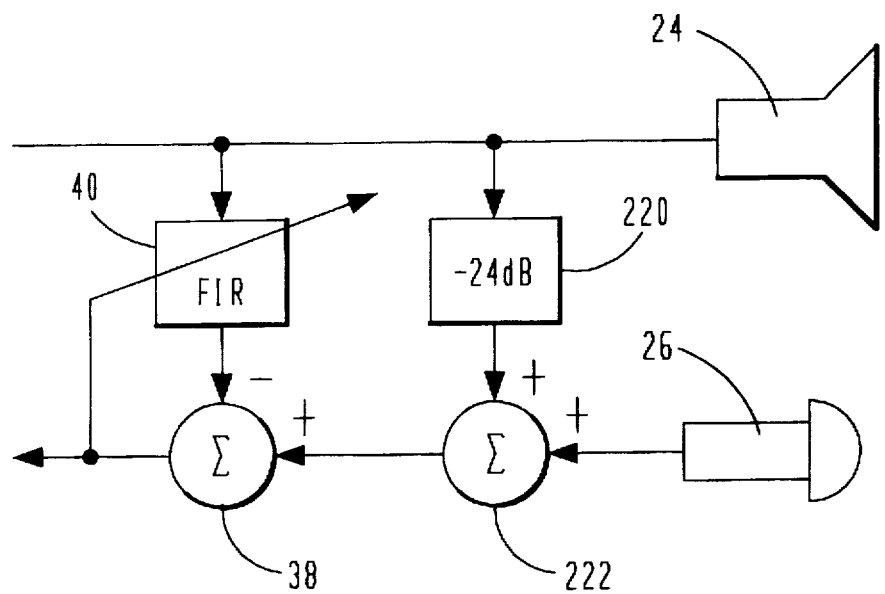
FIG. 8 illustrates a block diagram of the sidetone circuit of the present invention.

Referring now to FIG. 8, there is illustrated a block diagram of a circuit for accounting for sidetones. In general, a speaker phone configuration will have the microphone and the speaker connected close together. If this is the case, then there will be a high probability of having fairly strong return echo which will allow the adaptive filter to operate. Typically, when the system is initialized, the adaptive filter must be trained. In order to be trained, it must have some type of return path echo. During the training operation, the speaker phone will typically operate in half-duplex mode. Once the adaptive filter 40 is trained, then the system will switch over to full-duplex operation. It is desirable to have the system operate in a full-duplex mode, since this provides all of the advantages of an echo canceller.

Whenever the configuration of the system is such that there is very little return path echo, such as a situation wherein a personal computer is utilized and the microphone 26 and speaker 24 are separated by a large distance, this can result in a situation where the system will remain in half-duplex mode. To account for this situation, a predetermined amount of return path echo is inserted in the form of a return path 220 which feeds back the input to the speaker attenuated by a factor of, in the preferred embodiment, 24 dB to a summation circuit 222. The summation circuit 222 is operable to sum the return path value attenuated by, in the preferred embodiment, 24 dB with the output of the microphone, this then being fed to the subtraction circuit 38. Therefore, there will always be an ERLE calculated, even in the event of no external return path. This in effect allows the adaptive filter 40 to train itself such that a system can then operate in full-duplex mode.

Figure 9:
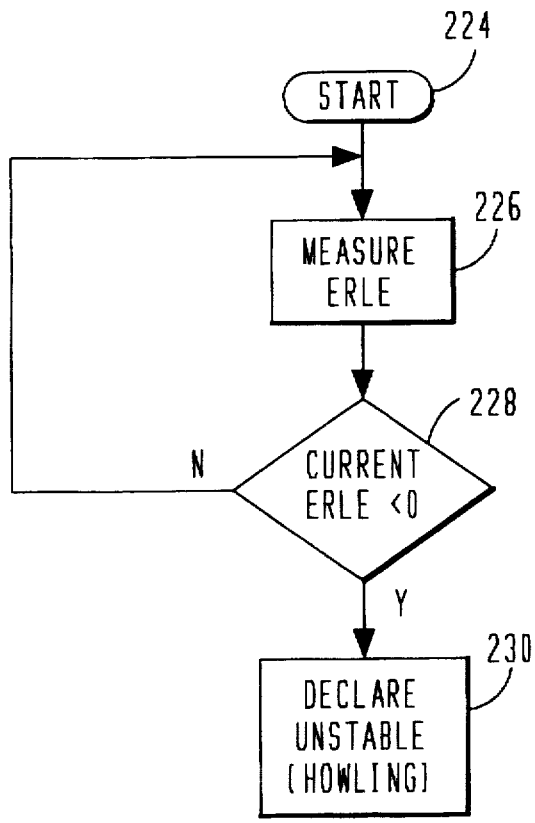
FIG. 9 illustrates a flow chart of the howling detector.

Referring now to FIG. 9, there is illustrated a flow chart depicting the operation of the system to account for a "howling" mode, which is another technique to provide for radical path change detection. Howling is a situation wherein the adaptive filter actually enters an "additive" mode wherein the estimated power at node 44 is greater than it should be and in fact is greater than the input on node 36 to the subtraction block 38. The flow chart is initiated at a Start block 224 and then proceeds to a function block 226 to measure the ERLE and then to a decision block 228 to determine if the current ERLE value is less than zero by a predetermined value, such as 12 dB in the preferred embodiment. If so, this indicates an additive system and the program will flow along a "Y" path to a function block 230 to declare the system unstable, i.e., howling. If not, the program will flow along a "N" path back to the input of the function block 226.

A disadvantage to gradually decreasing the value of SERLE is that updates may eventually be enabled during times when the near-end noise floor is elevated. This can become an important issue, due to the fact that the ERLE in practical applications is limited by the near-end noise level. If the near-end noise level rises, and the echo canceller is allowed to update, the ERLE is likely to decrease. Fortunately, the elevated noise will likely mask much of the resulting higher echo from the perspective of the far end. Unfortunately, the loop-gain reduction being provided by the echo canceller will also decrease. If the far end is relying on the near-end echo canceller for a loop-gain reduction, the loop may go unstable, if the SERLE is reduced too much.

To prevent unnecessary degradation to the ERLE due to rises in the near-end noise floor, it is necessary to block updates when the near-end background noise level rises significantly. In particular, the background near-end noise level is saved whenever the SERLE is replaced with the current value of ERLE. Then, updates are blocked whenever the current near-end noise floor is higher (in the preferred embodiment, 6 dB) than the saved background noise level. This technique assumes that either radical path changes will not occur while updates are blocked due to updated near-end noise, or alternatively, that a supplementary path-change detector as described above is available.

Figure 10:
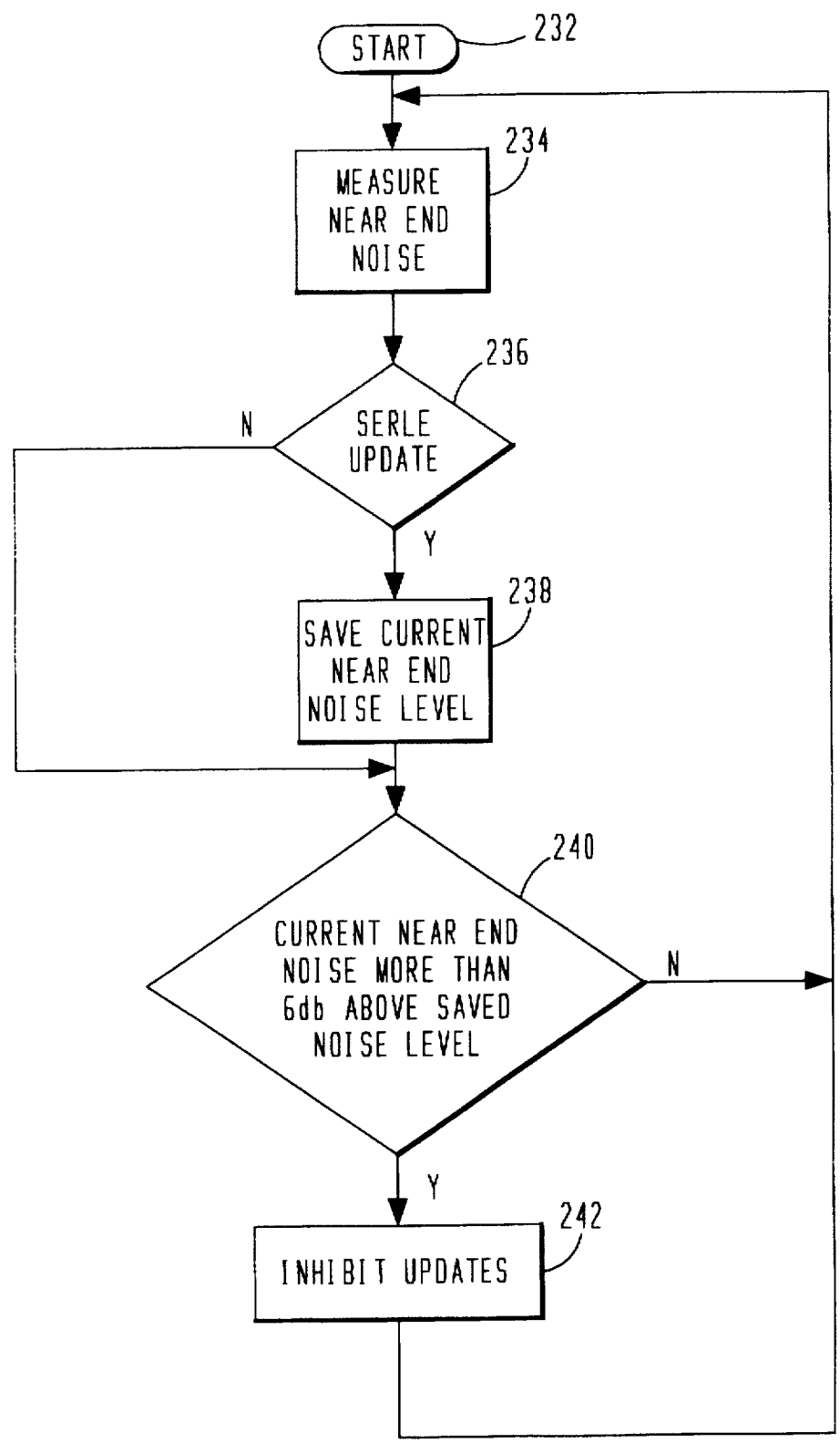
FIG. 10 illustrates a flow chart for the operation to inhibit updates as a function of near-end noise level.

Referring now to FIG. 10, there is illustrated a flow chart depicting the operation of inhibiting updates whenever the near-end noise increases. The flow chart is initiated at a Start block 232 and then flows to a function block 234 to measure the near-end noise. The program then flows to a decision block 236 to determine if the stored value of ERLE has been updated and if so, the program will flow along the "Y" path to a function block 238 to save the current near-end noise level. If not, the program will flow along the "N" path to the output of function block 238. At this point in the program, the program will flow to a decision block 240 to determine if the current near-end noise level is greater than 6 dB above the saved noise level. If so, the program will flow along the "Y" path to a function block 242 to inhibit updates. If not, the program will along "N" path back to the input of function block 234. After the updates are inhibited, the program flows back to the input of function block 234. When the updates are inhibited, this will continue until it is determined that the program flows along the "N" from decision block 240, at which time the updates will be allowed if previously inhibited.

It is desirable in the operation of the echo-canceller to not update the active filter 40 while tones are present as the training signal. If an adaptive filter trains on a tone, the ERLE for that tone is likely to be excellent, but if different tones or wideband signals are subsequently passed through that echo-canceller, the ERLE is likely to be worse, at least until the adaptive filter retrains itself.

Figure 11:
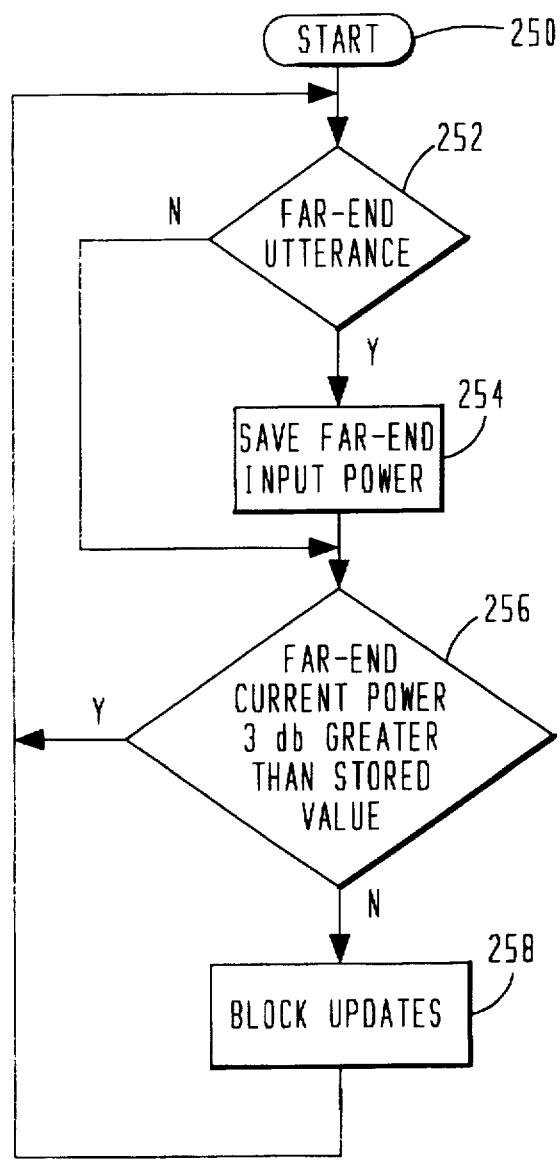
FIG. 11 illustrates a flow chart for the update blocking operation during tones.

To block updates during tones, the flow chart of FIG. 11 is referred to. In FIG. 11, the flow chart is initiated at a Start block 250 and then proceeds to a decision block 252. The decision block 252 determines whether a far-end utterance has been declared. If so, the program flows along a "Y" path to a function block 254, wherein the current far-end input power is saved in a register as the saved far-end input power. The program then flows to a decision block 256. If the decision block 252 determines that a far-end utterance has not been declared, the program flows along an "N" path to the decision block 256. The decision block 256 determines whether the current far-end input power is greater than the stored value in the register by 3 dB, in the preferred embodiment. If not, the program flows along the "N" path to a function block 258 to block updates. If so, the program flows along the "Y" path back to the input of decision block 252, this also being the path from the function block 258.

The assumption in the process of the present invention is that tones are constant-power processes, independent of their spectral characteristics. Speech, on the other hand, is not. If speech is present as the training signal, one would expect that its power level would quickly drift outside the plus +/−3 dB power bounds, enabling updates. It is noteworthy that white noise is typically a constant-power process, such that updates would also be blocked when an "utterance" consisting of white noise is received. This is important, since such white noise bursts are frequently utilized to test the performance of echo-cancellers.

Figure 12:
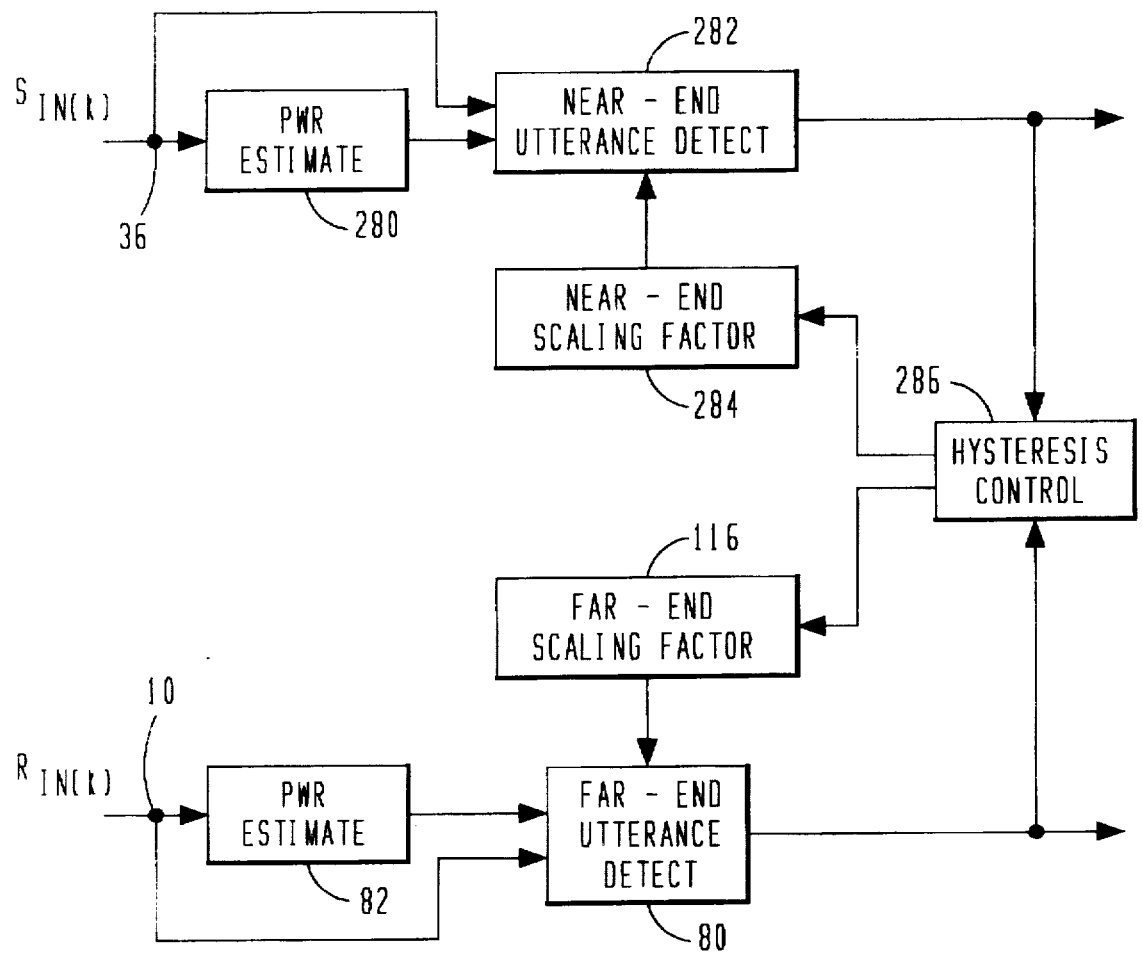
FIG. 12 illustrates a block diagram of hysteresis control of the utterance detection operation.

Referring now to FIG. 12, there is illustrated in alternate embodiment with respect to the way in which the utterance detect operation is performed. As mentioned above, the detection of a far-end utterance can be made in addition to detection of a near-end utterance. The far-end utterance detection is achieved with the detection block 80 as described above with respect to FIGS. 2 and 3 with a scaling factor provided by block 116, this being a fraction of the stored background noise which is input to a comparator, this being compared to the absolute value of the raw input signal $R_{in}(k)$. Similarly, the raw transmitted signal $S_{in}(k)$ on node 36 is input to a power estimator 280 to provide an estimate of the background noise at the near end. The output of the power estimator block 280 is input to a near-end utterance detect circuit 282, similar to the utterance detect circuit 80. This utterance detect circuit 282 is also operable to receive the raw input signal $S_{in}(k)$ and utilize a near-end scaling factor in a block 284 in order to provide a threshold by which to compare the absolute value of the raw input signal $S_{in}(k)$.

In this embodiment, hysteresis is provided by the hysteresis control circuit 286 that is operable to determine the scaling factor for each of the far-end scaling factor block 116 and the near-end scaling factor block 284. The hysteresis control circuit utilizes the output of each of the utterance detect circuits 80 and 282, as will be described herein below.

Figure 13:
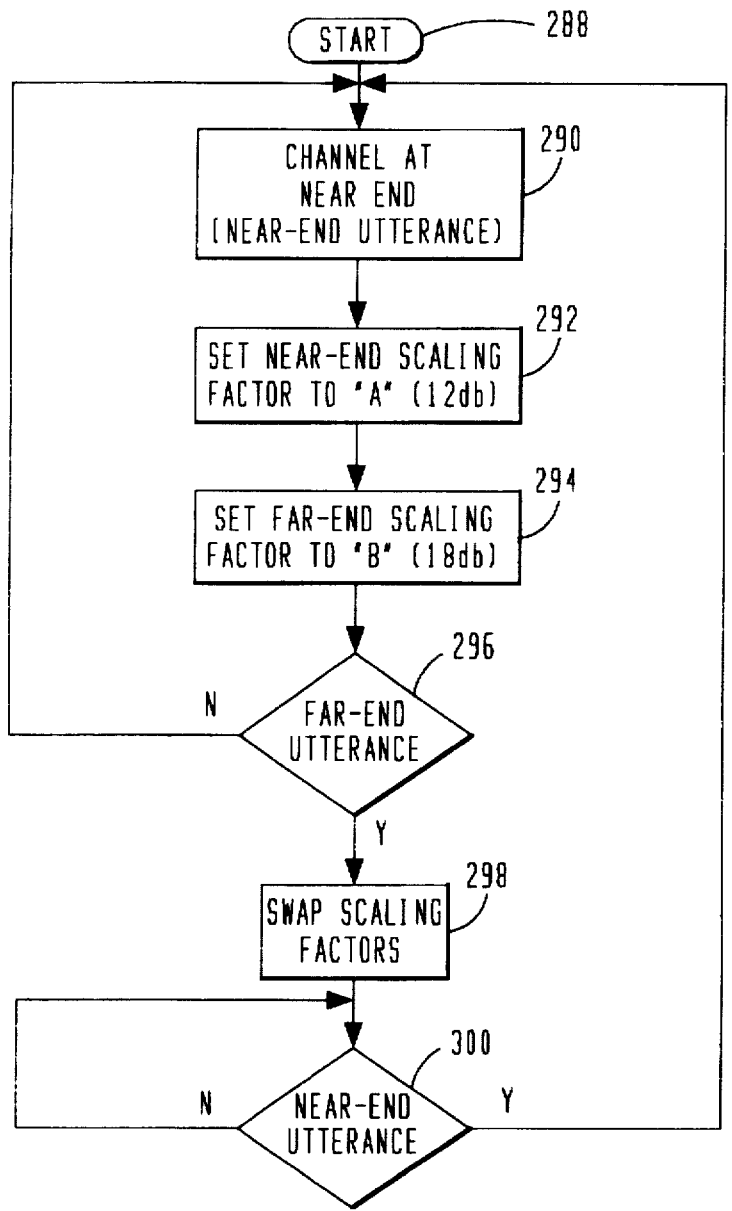
FIG. 13 illustrates a flowchart for the structure of FIG. 12.

Referring now to FIG. 13, there is illustrated a flowchart depicting the operation of the hysteresis control block 286 of FIG. 12. The program is initiated at a Start block 288 and then proceeds to a function block 290 which indicates that a near-end utterance has been detected. In this condition, it is noted that the party at the near end has "seized" the channel. The program then flows to a function block 292 wherein the near-end scaling factor is set to value "A", which in the preferred embodiment is 12 dB. The program then flows to a function block 294 to set the far-end scaling factor to value "B", which in the preferred embodiment is 18 dB. The program then flows to a decision block 296 to determine if a far-end utterance has been detected. If not, the program will flow back along the "N" path to the input of function block 290. When a far-end utterance is detected, the program will flow along the "Y" path to a function block 298 wherein the scaling factors are swapped between the two scaling factor blocks 116 and 284, such that now the near-end scaling factor will be 18 dB and the far-end scaling factor will be 12 dB. The program then flows to a decision block 300 wherein a determination is made as to whether a near-end utterance has been detected. If not, the program will flow back to the input of decision block 300. When a near-end utterance is detected, the program flows along the "Y" path back to the input of the function block 290. This system allows for the scaling factor to be set low at the near end relative to the far end scaling factor whenever an utterance is detected at the near end. Therefore, a far end utterance must be stronger in order to seize the channel away from the near-end.

Figure 14:
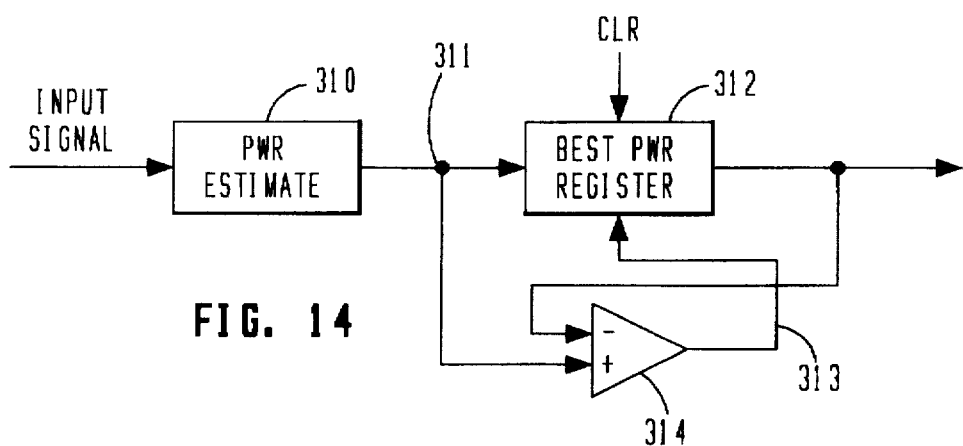
FIG. 14 illustrates a block diagram of the best signal power register.

Referring now to FIG. 14, there is illustrated a block diagram of the register for storing the best signal power. Each of the signals $R_{in}(k)$ and $S_{in}(k)$ are measured as an input signal with a power estimator 310, which is identical to either power estimator 82 or power estimator 280 in FIG. 12. The power estimator 310 determines the power in the input signal and outputs it on a node 311. Node 311 comprises an input to a best power register 312 which is operable upon receiving a latch signal to latch the value in the register 312. A comparator 314 is operable to provide the latch signal on an output 313. The comparator 314 has the positive input thereof connected to the node 311 and the negative input thereof connected to the output of the register 312. Therefore, the contents of the register 312 comprises the reference input to the comparator 314 and, whenever the node 311 has a value on it that is greater than the value stored in the register 312, an update signal is generated on the output line 313. Additionally, the contents of the register 312 can be cleared with a signal CLR.

Figure 15:
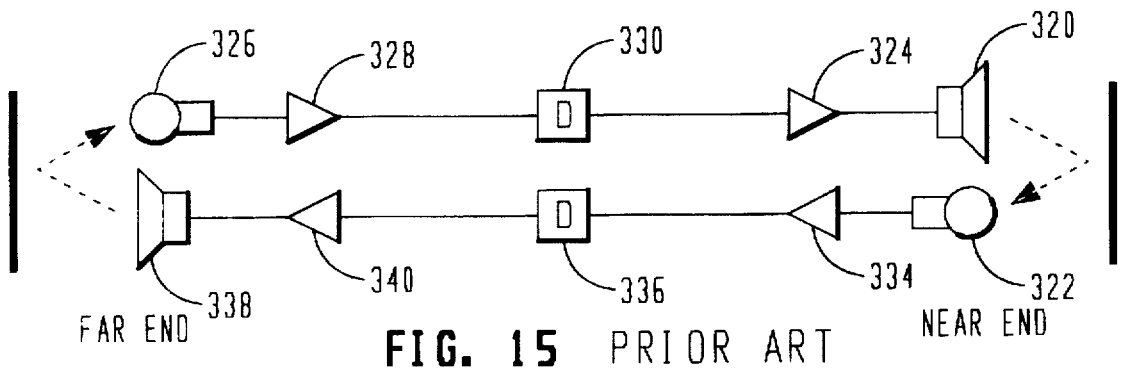
FIG. 15 illustrates a block diagram of a general system illustrating the acoustic-echo problem.

Referring to FIG. 15, there is illustrated a block diagram of a prior art system illustrating the far end and the near end and an associated acoustical echo, and the acoustical echo problem. At the near end, there is illustrated a speaker 320 and a microphone 322, the speaker 320 driven by an amplifier 324. A corresponding microphone 326 at the far end receives a signal from the far end and processes it through an amplifier 328 to pass it through a transmission line 330 to the amplifier 324 and the speaker 320. Very similarly, the microphone 322 receives the signal at the near end and passes it through an amplifier 334 through a transmission line 336 to a speaker 338 through an amplifier 340. Therefore, a signal in the form of speech from the far end will be injected into an echo path, i.e., a car interior for example. When the signal is injected, it reflects off of the surfaces in the echo path, and is then received at the microphone 322. When heard by the far-end user, these reflections, i.e., echos, can be very annoying. If echo also occurs at the far end, a closed feedback loop results; if the loop gain is high enough, the loop will go unstable, causing acoustic "howling".

Figure 16:
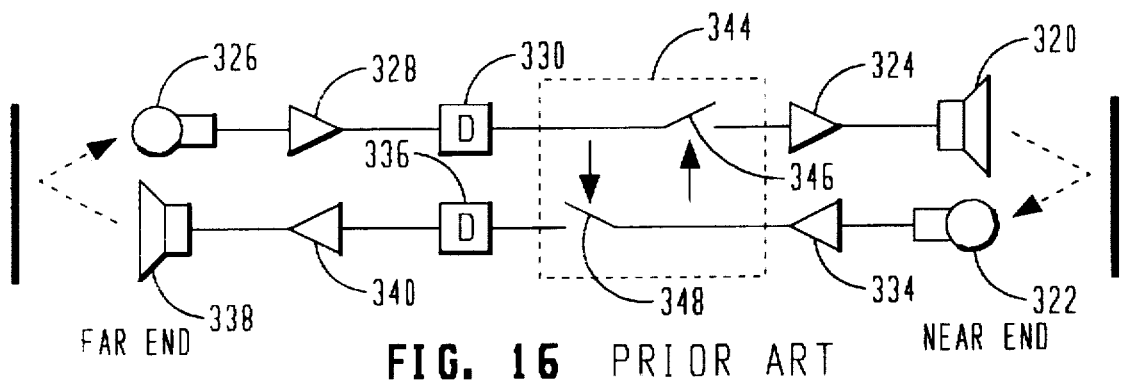
FIG. 16 illustrates a prior art half-duplex solution to the problem illustrated in FIG. 15.

Referring now to FIG. 16, there is illustrated one prior art solution to the acoustic howling problem. This is referred to as a half-duplex mode. In this mode, a half-duplex device 344 is disposed at the near end. The half-duplex device is comprised of a first series switch 346 disposed between the transmission line 330 and the amplifier 324 at the near end and controlled by the signal transmitted to the far-end. A second series switch 348 is disposed in series with the amplifier 334 and the transmission line 336 and controlled by the signal input to the switch 346 at the near end. In this mode, the far-end user is prevented from hearing echos by turning off the microphone at the near end while the far-end user is talking. The problem with this technique is that, although conversation is nominally half-duplex, full-duplex episodes are likely to occur, i.e., people typically talk one at a time, but frequently interrupt each other.

In addition to the above, noise events frequently occur in the near-end and far-end environments that are irrelevant to the information flow between speakers. Any method utilized to control which speaker can talk at any particular time should be as robust as possible to such noise. Half-duplex communication is therefore inherently unnatural, and it frequently annoys anyone accustomed to full-duplex communication. However, there are some advantages to half-duplex systems. They are cheaper to implement and their performance is less dependent on the attributes of the operating environment. As a result, half-duplex continues to have useful applications. In these applications, it is important to make the half-duplex system allow conversation that is as close to normal as possible. Specifically, figures of merit for half-duplex techniques in accordance with the present invention include:

1) Quick Response to the Onset of Speech

If the system is idle (i.e., both the far-end and near-end speakers are silent), and then the speaker at one end starts talking, that speaker should get the channel quickly, with minimal corruption of the start of his first utterance.

2) Resistance to Irrelevant Noise in Selecting Who Gets the Channel

Noise transients that occur while the system is idle, or while one speaker is talking should not cause the system to transfer control of the channel to the other speaker.

3) Resistance to Changing State Due to Near-end Echo

Echo at the near end can look like near-end speech to the half-duplex control system. Ideally, the half-duplex system should not change state due to reflections of far-end signal into the near-end microphone.

4) Minimum "Holdover"

Robustness to echo is achieved using "holdover", i.e., preventing changing channel control for some time interval after the end of a speech sequence for a particular speaker. If holdover is too long, the ability of the other speaker to respond quickly will be compromised.

5) Equal Access to Channel, Independent of Signal Strength

The louder talker (be it near end or far end) should not get the channel just because they are louder. The first speaker to talk should get the channel instead.

6) Ability to Compensate for Steady-state Background Noise

Steady-state background noise should not affect the decision of who gets the channel at any particular time.

Figure 17:
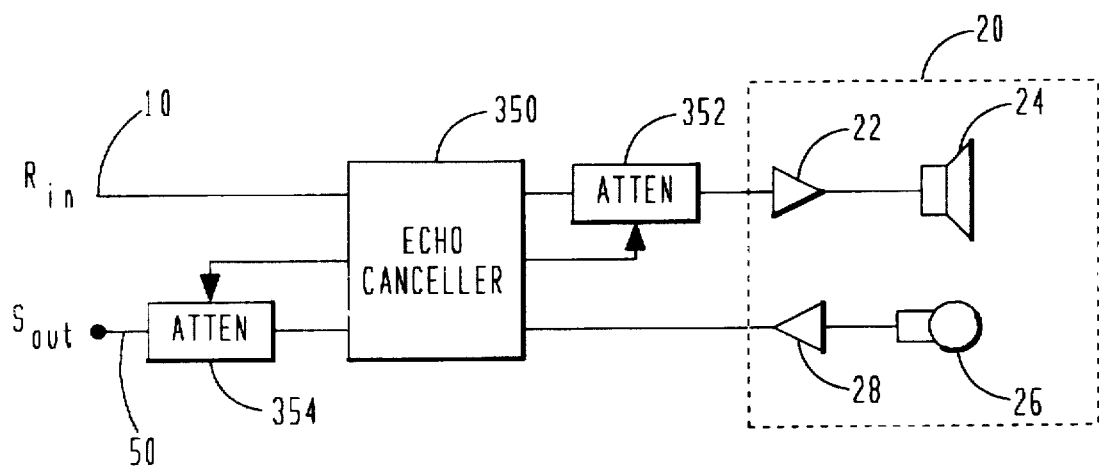
FIG. 17 illustrates a block diagram of the echo canceller of the present invention utilizing a half-duplex mode.

Referring now to FIG. 17, there is illustrated a block diagram of the half-duplex operation of the echo canceller of the present invention. In FIG. 17, the echo canceller is generally referred to as a block 350. The block 350 receives as the input signal from the far end and provides an output to an attenuator 352. The output of the attenuator 352 is input to the amplifier 22 and then to the speaker 24. It should be understood that the attenuator 352 is part of the echo canceller 350 and is controlled by the echo canceller 350. As such, the attenuator 352 is realized in the digital domain and, it will therefore be on the digital side of the data conversion devices. In a similar manner, the echo canceller 350 also receives from the near end the output of the amplifier 28 and then attenuates the output signal to line 50 with an attenuator 354, this also being part of the echo canceller 350 and being in the digital domain. As will be described here below, the attenuators 352 and 354 provide the isolation switching operation for the half-duplex mode of operation. In addition, the echo canceller has a far-end and a near-end utterance detector, as depicted in FIG. 12, with two different attenuations provided therefor, depending upon whether the near end has access to the channel or the far end has access to the channel.

Figure 18:
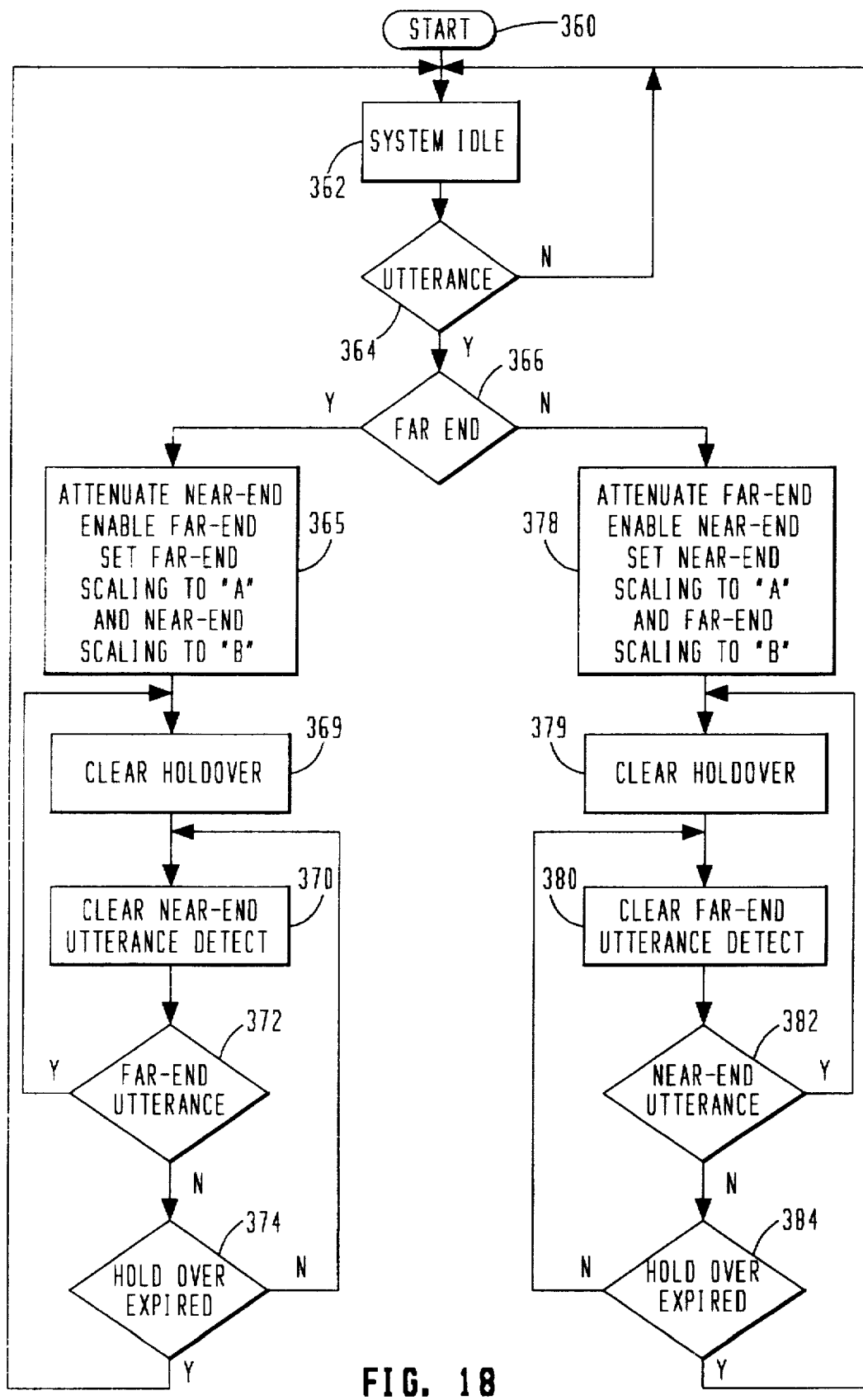
FIG. 18 illustrates a flowchart depicting half-duplex operation.

Referring now to FIG. 18, there is illustrated a flowchart depicting the operation in the half-duplex mode. A program is initiated at a Start block 360 and then proceeds to a Function block 362 that indicates that the system is idle. In this mode, there are no utterances detected at either the far-end or the near-end and the attenuations or scaling factors are set at undetermined values. As described above, an utterance is defined as a transition in the signal power at the far end or the near end. In order to realize this, at each sample time, the near-end input power and the far-end output power are measured utilizing a peak-detecting power estimator. Independent background noise-power estimates are maintained for the near-end input and the far-end input. For example, the near-end background power is calculated at each sample time by replacing the near-end background power estimate with the latest near-end power estimate if it is lower. If the near-end power is higher than the background noise power for a pre-specified period of time, the background noise-power estimate is increased slightly (to compensate for increases in the background noise-power level). At each sample time, the raw input from each end is compared to its respective background noise-power estimator. On rising excursions of the raw input signal in which the raw input signal crosses the background noise power scaled up by some pre-specified factor, an "utterance" indicator for that end is incremented. Whenever the background power estimate is lowered, the utterance detector for that end is cleared. This is represented by a decision block 364 which determines if an utterance has been detected. If an utterance has not been detected, the program will flow back to the input of the Function block 362 along the "N" path.

If an utterance is detected, it can be from either the far end or the near end. The program will flow along a "Y" path to a decision block 366 to determine whether it is the far end or near end. If it is the far end, the program will flow along a "Y" path to a Function block 368. Function block 368 indicates the operation wherein the far end is enabled and the near end is attenuated. The far-end scaling factor is set to the "A" level and the near-end scaling factor is set the "B" level. This was described hereinabove with respect to FIG. 13. Once the scaling factors have been set, the program will flow to a Function block 369 to clear a holdover counter and then to a Function block 370 to clear the near-end utterance detect and then proceeds to a Function block 372. Decision block 372 determines whether a far-end utterance has been detected. If so, the program flows along a "Y" path to the input of Function block 369 to clear the holdover counter and then to Function block 370 to again clear the near-end utterance detect. This continues until there is no far-end utterance detected. In this mode, the end that has seized control of the channel will maintain control of that channel as long as speech, or an utterance, is detected. Once an utterance or speech is not detected, the program will flow along the "N" path and a decision block 374 will determine if a holdover time period has expired. This holdover time period prevents the opposite end from seizing the operation of the half-duplex system for a specified period. The program will flow along the "N" path back to the input of the decision block 370 until this holdover time has expired, the near-end utterance cleared also. If no utterances are detected during this period, then the program will flow along the "Y" path from decision block 374 back to the input of the system idle block 362. The holdover period is a function of the number of times that the system loops back to the decision block 370 from the decision block 374.

If the near end had seized control of the channel due to either the holdover period expiring or the system merely being seized by the near end, the program will flow from decision block 366 along the "N" path to a Function block 378. Function block 378 functions similar to Function block 368 in that it attenuates the far end and enables the near end, and basically "swaps" the scaling factor such that the scaling factor "A" is set for the near-end scaling factor and the scaling factor "B" is set for the far-end scaling factor. The program will then flow to a Function block 379 to clear the near-end holdover counter and then to a Function block 380, similar to Function block 370 to clear the far-end utterance detect, and then to a decision block 382, similar to decision block 372. This will determine if the near-end utterance has been detected. If so, the program will flow along the "Y" path back to the input of the Function block 379. If not, the program will flow along the "N" path to a Function Block 384, similar to the Function Block 374, and relating to the near-end holdover expiration. If it has not expired, the program will flow along the "N" path back to the input of Function block 380 and, if it has expired, the program will flow back to the input of Function block 362 along a "Y" path.

In summary, there has been provided a double-talk detector which utilizes an ERLE measurement for determining when updates are allowed. In general, the ERLE is measured and the best ERLE (SERLE) is stored in a register. This value is utilized for comparison with the current ERLE and, when the difference between the current ERLE and the SERLE differs by a fraction, any updates by the adaptive filter and the echo canceller associated with the double-talk detector are blocked or inhibited. Further, the saved value of the best ERLE is decremented under certain conditions. One condition is the detection of an utterance from the far-end path. In addition, a half-duplex mode is provided whereby different scaling factors are associated with the detection of an utterance at each end to provide different attenuations therefor. The utterance is detected by determining when the raw signal power at either the far end or the near end exceeds the background noise power by a pre-determined level above the background noise power for that end. The pre-determined level is the scaling factor and it is set to a lower value once an utterance has been detected for that end and to a higher value for the end at which an utterance was not detected. The end that "seizes" control of the half-duplex mode will maintain access to the system, i.e., have the lowest attenuation, as long as continued utterances are detected. Additionally, when utterances are not detected, a pre-determined period of time is required before the other end is allowed to seize access to the system.

Although the preferred embodiment has been described in detail, it should be understood that various changes, substitutions and alterations can be made therein without departing from the spirit and scope of the invention as defined by the appended claims.

What is claimed is:

1. A half-duplex controller for a two way communication system between a near end servicing a first user and a far end servicing a second user, comprising:

a receive switching device for selectively attenuating the received signal at the near end;

a transmit switching device for selectively attenuating the transmit signal from the near end;

a near-end speech detector for detecting when near-end speech has exceeded a near-end threshold more than a predetermined number of times;

a far-end speech detector for detecting when far-end speech has exceeded a far-end threshold more than a predetermined number of times;

a controller for decreasing to a predetermined low threshold value the one of said near-end and far-end thresholds associated with the one of the near-end and far-end speech detectors that detects speech exceeding its associated near-end or far-end threshold said associated predetermined number of times, and increasing the other of the near-end and far-end thresholds to a predetermined high threshold value higher than said low threshold value; and said receive switching device set to selectively attenuate the received signal at the near end and said transmit switching device set to not attenuate the transmit signal from the near end when the near-end threshold is disposed at said low threshold value, said receive switching device set to selectively not attenuate the received signal at the near end with said transmit switching device selectively set to attenuate the transmit signal from the near end when the far-end threshold is disposed at said low threshold value.

2. The half-duplex controller of claim 1, wherein the said controller further operates to inhibit decreasing the one of said near-end or far-end thresholds to said low threshold value until a pre-determined duration of time after the one of said near-end or far-end speech detectors associated with said low threshold has detected speech.

3. The half-duplex controller of claim 1, wherein said low and high threshold values are each a separate and pre-determined high and low scaling factor, respectively, above the respective near-end or far-end background noise power level.

4. The half-duplex controller of claim 3, wherein each of said near-end speech detector and said far-end speech detector comprises:

a background noise estimator for estimating the respective far-end or near-end noise power at the respective end;

a background noise register associated with each of the far end and near end for storing a respective background noise level;

an offset device for offsetting the value stored in the respective background noise registers by the one of said high or low scaling factors;

a comparator for comparing the respective signal level to the respective stored offset background noise level to determine when said respective raw signal level rises above the respective offset value and a counter for counting the number of times that the respective signal level crosses the respective background noise level and accruing such count and when said accrued count exceeds said associated predetermined number of times, this constituting detected speech.

5. A method for controlling two-way communication between a near end servicing a first user and a far end servicing a second user and utilizing a half-duplex controller, comprising the steps of:

selectively attenuating the received signal at the near end with a receive switching device;

selectively attenuating a transmit signal from the near end with a transmit switching device;

detecting when near-end speech has exceeded a near-end threshold more than a predetermined number of times;

detecting when far-end speech has exceeded a far-end threshold more than a predetermined number of times;

decreasing to a pre-determined low threshold value the one of the near-end and far-end thresholds associated with the one of the near-end and far-end speech detectors that detects speech exceeding its associated near-end or far-end threshold, and increasing the other of the near-end and far-end thresholds to a pre-determined high threshold value higher than the low threshold value; and controlling the receive switching device to selectively attenuate the received signal at the near end and controlling the transmit switching device to not attenuate the transmit signal from the near end when the near-end threshold is disposed at the low threshold value, and controlling the receive switching device to selectively not attenuate the received signal at the near end with the transmit switching device controlled to selectively attenuate the transmit signal from the near end when the far-end threshold is disposed at the low threshold value.

6. The method of claim 5, and further comprising inhibiting the step of decreasing the one of the near-end or far-end thresholds to the low threshold value until a pre-determined duration of time after the one of the near-end or far-end speech detectors associated with the low threshold has detected speech.

7. The method of claim 5, wherein the low and high threshold values are each a separate and pre-determined high and low scaling factor, respectively, above the respective near-end or far-end background noise power level.

8. The method of claim 7, wherein the step of detecting when near-end speech has exceeded a near-end threshold or far-end speech has exceeded a far-end threshold comprises the steps of:

estimating the respective far-end or near-end noise power at the respective end;

storing a respective background noise level at each end in a respective background noise register;

offsetting the value stored in the respective background noise registers by the one of the high or low scaling factors;

comparing the respective signal level to the respective stored offset background noise level to determine when the respective raw signal level rises above the respective offset value; and counting the number of times that the respective signal level crosses the respective background noise level and accruing such count, and when the accrued count exceeds associated predetermined number of times, this constituting detected speech.

* * * * *